US012322052B2

(12) United States Patent
Kratz et al.

(10) Patent No.: US 12,322,052 B2
(45) Date of Patent: Jun. 3, 2025

(54) MIXING AND MATCHING VOLUMETRIC CONTENTS FOR NEW AUGMENTED REALITY EXPERIENCES

(71) Applicant: Snap Inc., Santa Monica, CA (US)

(72) Inventors: Sven Kratz, Mercer Island, WA (US); Andrés Monroy-Hernández, Princeton, NJ (US); Brian Anthony Smith, New York, NY (US); Rajan Vaish, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/058,175

(22) Filed: Nov. 22, 2022

(65) Prior Publication Data

US 2024/0071006 A1    Feb. 29, 2024

Related U.S. Application Data

(60) Provisional application No. 63/402,604, filed on Aug. 31, 2022.

(51) Int. Cl.
*G06T 19/00* (2011.01)
*G06F 3/04815* (2022.01)

(52) U.S. Cl.
CPC ........ *G06T 19/006* (2013.01); *G06F 3/04815* (2013.01)

(58) Field of Classification Search
CPC ....... G06T 19/006; G06T 15/00; G06T 15/08; G06F 3/04815; G06F 2111/18; G06V 20/20
See application file for complete search history.

(56) References Cited

U.S. PATENT DOCUMENTS

| | | |
|---|---|---|
| 4,807,158 A | 2/1989 | Blanton et al. |
| 6,038,295 A | 3/2000 | Mattes |
| 6,430,997 B1 | 8/2002 | French et al. |
| 6,819,982 B2 | 11/2004 | Doane |
| 6,980,909 B2 | 12/2005 | Root et al. |
| 7,173,651 B1 | 2/2007 | Knowles |
| 7,190,496 B2 | 3/2007 | Klug et al. |

(Continued)

FOREIGN PATENT DOCUMENTS

| | | |
|---|---|---|
| CA | 2887596 | 7/2015 |
| CN | 105912129 | 8/2016 |

(Continued)

OTHER PUBLICATIONS

US 10,656,660 B1, 05/2020, Meisenholder et al. (withdrawn)

(Continued)

*Primary Examiner* — Antonio A Caschera
(74) *Attorney, Agent, or Firm* — Schwegman Lundberg & Woessner, P.A.

(57) ABSTRACT

A volumetric content presentation system includes a head-worn display device, which includes one or more processors, and a memory storing instructions that, when executed by the one or more processors, configure the display device to access AR content items that correspond to either real-world objects or virtual objects, mix and match these AR content items, and present volumetric content that includes these mixed and matched AR content items overlaid on a real-world environment to create a new AR scene that a user can experience.

16 Claims, 14 Drawing Sheets

(56) References Cited

U.S. PATENT DOCUMENTS

| | | |
|---|---|---|
| 7,411,493 B2 | 8/2008 | Smith |
| 7,535,890 B2 | 5/2009 | Rojas |
| 7,542,073 B2 | 6/2009 | Li et al. |
| 8,046,719 B2 | 10/2011 | Skourup et al. |
| 8,131,597 B2 | 3/2012 | Hudetz |
| 8,174,562 B2 | 5/2012 | Hartman |
| 8,199,747 B2 | 6/2012 | Rojas et al. |
| 8,274,550 B2 | 9/2012 | Steuart, III |
| 8,332,475 B2 | 12/2012 | Rosen et al. |
| 8,608,563 B2 | 12/2013 | Miyazaki et al. |
| 8,646,720 B2 | 2/2014 | Shaw |
| 8,718,333 B2 | 5/2014 | Wolf et al. |
| 8,724,622 B2 | 5/2014 | Rojas |
| 8,812,954 B2 | 8/2014 | Shuster et al. |
| 8,874,677 B2 | 10/2014 | Rosen et al. |
| 8,909,679 B2 | 12/2014 | Root et al. |
| 8,934,015 B1 | 1/2015 | Chi et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,186,548 B2 | 11/2015 | House et al. |
| 9,191,776 B2 | 11/2015 | Root et al. |
| 9,204,252 B2 | 12/2015 | Root |
| 9,235,932 B2 | 1/2016 | Choi et al. |
| 9,344,642 B2 | 5/2016 | Niemi et al. |
| 9,345,711 B2 | 5/2016 | Friedhoff |
| 9,443,227 B2 | 9/2016 | Evans et al. |
| 9,445,081 B1 | 9/2016 | Kouperman et al. |
| 9,471,059 B1 | 10/2016 | Wilkins |
| 9,489,661 B2 | 11/2016 | Evans et al. |
| 9,489,937 B1 | 11/2016 | Beard et al. |
| 9,491,134 B2 | 11/2016 | Rosen et al. |
| 9,551,873 B2 | 1/2017 | Zalewski |
| 9,576,369 B2 | 2/2017 | Venkataraman et al. |
| 9,582,166 B2 | 2/2017 | Vaittinen et al. |
| 9,586,147 B2 | 3/2017 | Bathiche et al. |
| 9,589,448 B1 | 3/2017 | Schneider et al. |
| 9,681,046 B2 | 6/2017 | Adsumilli et al. |
| 9,703,369 B1 | 7/2017 | Mullen |
| 9,723,272 B2 | 8/2017 | Lu et al. |
| 9,747,901 B1 | 8/2017 | Gentry |
| 9,761,057 B2 | 9/2017 | Salter et al. |
| 9,779,538 B2 | 10/2017 | Sanders et al. |
| 9,794,527 B1 | 10/2017 | Balez et al. |
| 9,818,225 B2 | 11/2017 | Wang et al. |
| 9,916,673 B2 | 3/2018 | Castro et al. |
| 9,922,659 B2 | 3/2018 | Bradlow et al. |
| 9,989,965 B2 | 6/2018 | Cuban et al. |
| 10,061,328 B2 | 8/2018 | Canoy et al. |
| 10,109,224 B1 | 10/2018 | Ratti et al. |
| 10,140,987 B2 | 11/2018 | Erickson et al. |
| 10,168,700 B2 | 1/2019 | Gordon et al. |
| 10,282,903 B1 | 5/2019 | Clark et al. |
| 10,289,193 B2 | 5/2019 | Hardy et al. |
| 10,313,481 B2 | 6/2019 | Kada |
| 10,325,410 B1 | 6/2019 | Smith et al. |
| 10,365,784 B2 | 7/2019 | Inomata |
| 10,370,118 B1 | 8/2019 | Nielsen et al. |
| 10,403,050 B1 | 9/2019 | Beall et al. |
| 10,445,925 B2 | 10/2019 | Tokubo |
| 10,445,940 B2 | 10/2019 | Guay et al. |
| 10,482,665 B2 | 11/2019 | Copic et al. |
| 10,501,180 B2 | 12/2019 | Yu |
| 10,504,277 B1 | 12/2019 | Haitani et al. |
| 10,581,940 B1 | 3/2020 | Iyer et al. |
| 10,599,286 B2 | 3/2020 | Inomata |
| 10,616,663 B2 | 4/2020 | Davisson et al. |
| 10,768,639 B1 | 9/2020 | Meisenholder et al. |
| 10,768,776 B1 | 9/2020 | Roche et al. |
| 10,796,489 B1 | 10/2020 | Cordes et al. |
| 10,819,946 B1 | 10/2020 | Tanumihardja et al. |
| 10,901,215 B1 | 1/2021 | Newcombe et al. |
| 10,921,878 B2 | 2/2021 | Noris et al. |
| 10,937,239 B2 | 3/2021 | Huston et al. |
| 11,006,095 B2 | 5/2021 | Holzer et al. |
| 11,051,049 B2 | 6/2021 | Bustamante et al. |
| 11,062,517 B2 | 7/2021 | Crews et al. |
| 11,094,127 B2 | 8/2021 | Mccall |
| 11,126,206 B2 | 9/2021 | Meisenholder et al. |
| 11,145,123 B1 | 10/2021 | Chor et al. |
| 11,156,830 B2 | 10/2021 | Johnson et al. |
| 11,163,358 B2 | 11/2021 | Marks et al. |
| 11,194,439 B2 | 12/2021 | Laaksonen et al. |
| 11,200,028 B2 | 12/2021 | Newell et al. |
| 11,200,742 B1 | 12/2021 | Post et al. |
| 11,302,077 B2 | 4/2022 | Kang et al. |
| 11,361,473 B1 | 6/2022 | Abdollahian et al. |
| 11,372,474 B2 | 6/2022 | Schweet et al. |
| 11,413,514 B2 | 8/2022 | Marty et al. |
| 11,436,806 B1 | 9/2022 | Katz |
| 11,468,605 B2 | 10/2022 | Corson |
| 11,481,423 B1 | 10/2022 | Singleton |
| 11,481,980 B2 | 10/2022 | Yerli |
| 11,495,004 B1 | 11/2022 | Henry |
| 11,521,359 B2 | 12/2022 | Noorkami et al. |
| 11,623,138 B2 | 4/2023 | Yeh et al. |
| 11,734,905 B1 | 8/2023 | Henry |
| 11,769,299 B1 | 9/2023 | Stehlik et al. |
| 11,810,259 B2 | 11/2023 | Ramani et al. |
| 11,847,749 B2 | 12/2023 | Lebeaupin et al. |
| 11,941,764 B2 | 3/2024 | Harding et al. |
| 11,972,521 B2 | 4/2024 | Vaish et al. |
| 12,267,482 B2 | 4/2025 | Vaish et al. |
| 2004/0135890 A1 | 7/2004 | Kaneko et al. |
| 2006/0287025 A1 | 12/2006 | French |
| 2007/0167689 A1 | 7/2007 | Ramadas et al. |
| 2007/0250526 A1 | 10/2007 | Hanna |
| 2008/0081676 A1 | 4/2008 | Chakraborty et al. |
| 2008/0158256 A1 | 7/2008 | Russell et al. |
| 2008/0168411 A1 | 7/2008 | Mang et al. |
| 2008/0186255 A1 | 8/2008 | Cohen et al. |
| 2008/0211771 A1 | 9/2008 | Richardson |
| 2008/0255842 A1 | 10/2008 | Simhi |
| 2009/0122133 A1 | 5/2009 | Hartman |
| 2009/0171902 A1 | 7/2009 | Maclaurin et al. |
| 2009/0187389 A1 | 7/2009 | Dobbins et al. |
| 2009/0213114 A1 | 8/2009 | Dobbins et al. |
| 2010/0026809 A1 | 2/2010 | Curry |
| 2010/0125799 A1 | 5/2010 | Roberts et al. |
| 2010/0185984 A1 | 7/2010 | Wright et al. |
| 2010/0260422 A1 | 10/2010 | Ito et al. |
| 2011/0179313 A1 | 7/2011 | Macdonald et al. |
| 2011/0202598 A1 | 8/2011 | Evans et al. |
| 2011/0214082 A1 | 9/2011 | Osterhout et al. |
| 2011/0242134 A1 | 10/2011 | Miller et al. |
| 2011/0261083 A1 | 10/2011 | Wilson |
| 2012/0027278 A1 | 2/2012 | Chaney et al. |
| 2012/0052947 A1 | 3/2012 | Yun |
| 2012/0131125 A1 | 5/2012 | Seidel et al. |
| 2012/0188452 A1 | 7/2012 | Keiser et al. |
| 2012/0194420 A1 | 8/2012 | Osterhout et al. |
| 2012/0209924 A1 | 8/2012 | Evans et al. |
| 2012/0263154 A1 | 10/2012 | Blanchflower et al. |
| 2012/0281885 A1 | 11/2012 | Syrdal et al. |
| 2012/0287274 A1 | 11/2012 | Bevirt |
| 2012/0320169 A1 | 12/2012 | Bathiche |
| 2013/0056581 A1 | 3/2013 | Sparks |
| 2013/0072296 A1 | 3/2013 | Miyazaki et al. |
| 2013/0083009 A1 | 4/2013 | Geisner et al. |
| 2013/0083173 A1 | 4/2013 | Geisner et al. |
| 2013/0162632 A1 | 6/2013 | Varga et al. |
| 2013/0238168 A1 | 9/2013 | Reyes |
| 2014/0013228 A1 | 1/2014 | Hutten |
| 2014/0038708 A1 | 2/2014 | Davison et al. |
| 2014/0254896 A1 | 9/2014 | Zhou et al. |
| 2014/0285522 A1 | 9/2014 | Kim et al. |
| 2014/0357366 A1 | 12/2014 | Koganezawa et al. |
| 2014/0368542 A1 | 12/2014 | Tawara et al. |
| 2015/0015486 A1 | 1/2015 | Osman et al. |
| 2015/0015608 A1 | 1/2015 | Park |
| 2015/0016777 A1 | 1/2015 | Abovitz et al. |
| 2015/0022432 A1 | 1/2015 | Stewart et al. |

(56) References Cited

U.S. PATENT DOCUMENTS

| | | |
|---|---|---|
| 2015/0035862 A1 | 2/2015 | Fischer et al. |
| 2015/0070272 A1 | 3/2015 | Kim et al. |
| 2015/0175263 A1 | 6/2015 | Reyes |
| 2015/0193979 A1 | 7/2015 | Grek |
| 2015/0199022 A1 | 7/2015 | Gottesman et al. |
| 2015/0287246 A1 | 10/2015 | Huston et al. |
| 2015/0331490 A1 | 11/2015 | Yamada |
| 2015/0355711 A1 | 12/2015 | Rihn |
| 2015/0362917 A1 | 12/2015 | Wang et al. |
| 2015/0363034 A1 | 12/2015 | Hinckley et al. |
| 2016/0004390 A1 | 1/2016 | Laska et al. |
| 2016/0027218 A1 | 1/2016 | Salter et al. |
| 2016/0049003 A1 | 2/2016 | Shuster et al. |
| 2016/0063987 A1 | 3/2016 | Xu et al. |
| 2016/0071548 A1 | 3/2016 | House et al. |
| 2016/0133230 A1 | 5/2016 | Daniels et al. |
| 2016/0161946 A1 | 6/2016 | Wuth Sepulveda et al. |
| 2016/0179096 A1 | 6/2016 | Bradlow et al. |
| 2016/0217623 A1 | 7/2016 | Singh |
| 2016/0292575 A1 | 10/2016 | Weast et al. |
| 2016/0292886 A1 | 10/2016 | Erad et al. |
| 2016/0307335 A1 | 10/2016 | Perry et al. |
| 2016/0307573 A1 | 10/2016 | Wobrock |
| 2016/0330532 A1 | 11/2016 | Bostick et al. |
| 2016/0336020 A1 | 11/2016 | Bradlow et al. |
| 2016/0350973 A1 | 12/2016 | Shapira et al. |
| 2016/0357258 A1 | 12/2016 | Yeom et al. |
| 2017/0031369 A1 | 2/2017 | Liu et al. |
| 2017/0061700 A1 | 3/2017 | Urbach et al. |
| 2017/0084051 A1 | 3/2017 | Weising et al. |
| 2017/0094259 A1 | 3/2017 | Kouperman et al. |
| 2017/0099424 A1 | 4/2017 | Jones |
| 2017/0102699 A1 | 4/2017 | Anderson |
| 2017/0177925 A1 | 6/2017 | Volkart |
| 2017/0208103 A1 | 7/2017 | Sarmova |
| 2017/0225796 A1 | 8/2017 | Sun et al. |
| 2017/0228690 A1 | 8/2017 | Kohli |
| 2017/0237940 A1 | 8/2017 | Chaney et al. |
| 2017/0244937 A1 | 8/2017 | Meier et al. |
| 2017/0256040 A1 | 9/2017 | Grauer |
| 2017/0266554 A1 | 9/2017 | Marks et al. |
| 2017/0269685 A1 | 9/2017 | Marks et al. |
| 2017/0320564 A1 | 11/2017 | Kuzikov |
| 2017/0323481 A1 | 11/2017 | Tran et al. |
| 2017/0324841 A1 | 11/2017 | Clement et al. |
| 2017/0337791 A1 | 11/2017 | Gordon-Carroll |
| 2017/0359624 A1 | 12/2017 | Englert et al. |
| 2017/0364153 A1 | 12/2017 | Kazansky et al. |
| 2017/0365098 A1 | 12/2017 | Auten et al. |
| 2017/0365102 A1 | 12/2017 | Huston et al. |
| 2017/0371353 A1 | 12/2017 | Millinger, III |
| 2018/0005429 A1 | 1/2018 | Osman et al. |
| 2018/0059783 A1 | 3/2018 | Van Hoff et al. |
| 2018/0082682 A1 | 3/2018 | Erickson et al. |
| 2018/0098059 A1 | 4/2018 | Valdivia et al. |
| 2018/0130257 A1 | 5/2018 | Moran |
| 2018/0154232 A1 | 6/2018 | Gentil |
| 2018/0190033 A1 | 7/2018 | Barnett et al. |
| 2018/0246529 A1 | 8/2018 | Hu et al. |
| 2018/0270427 A1 | 9/2018 | Damstra et al. |
| 2018/0288364 A1 | 10/2018 | Virhiä |
| 2018/0311585 A1 | 11/2018 | Osman |
| 2018/0329486 A1 | 11/2018 | Williams et al. |
| 2019/0005546 A1 | 1/2019 | Chen et al. |
| 2019/0005728 A1 | 1/2019 | Leppanen et al. |
| 2019/0011921 A1 | 1/2019 | Wang et al. |
| 2019/0054379 A1 | 2/2019 | Ackley et al. |
| 2019/0073831 A1 | 3/2019 | Kim |
| 2019/0073832 A1 | 3/2019 | Kim |
| 2019/0130599 A1 | 5/2019 | Gebbie et al. |
| 2019/0130631 A1 | 5/2019 | Gebbie et al. |
| 2019/0138260 A1 | 5/2019 | Rogers et al. |
| 2019/0172265 A1 | 6/2019 | Cossairt et al. |
| 2019/0180509 A1 | 6/2019 | Laaksonen et al. |
| 2019/0182471 A1 | 6/2019 | Khalid et al. |
| 2019/0188895 A1 | 6/2019 | Miller, IV et al. |
| 2019/0199993 A1 | 6/2019 | Babu J D et al. |
| 2019/0208189 A1 | 7/2019 | Lau et al. |
| 2019/0217189 A1 | 7/2019 | Gutierrez et al. |
| 2019/0278369 A1 | 9/2019 | Ballard |
| 2019/0325654 A1 | 10/2019 | Stisser et al. |
| 2019/0358547 A1 | 11/2019 | Mack et al. |
| 2020/0020136 A1 | 1/2020 | Hwang et al. |
| 2020/0042160 A1 | 2/2020 | Gabbi et al. |
| 2020/0043235 A1 | 2/2020 | Chapman et al. |
| 2020/0051336 A1 | 2/2020 | Ichikawa et al. |
| 2020/0066043 A1 | 2/2020 | Graham et al. |
| 2020/0097077 A1 | 3/2020 | Nguyen et al. |
| 2020/0098179 A1 | 3/2020 | Gough et al. |
| 2020/0098191 A1 | 3/2020 | Mccall |
| 2020/0101372 A1 | 4/2020 | Drake et al. |
| 2020/0126257 A1 | 4/2020 | Tauber |
| 2020/0134911 A1 | 4/2020 | Van Hoff et al. |
| 2020/0159361 A1 | 5/2020 | Rosenberg et al. |
| 2020/0162779 A1 | 5/2020 | Saxena |
| 2020/0169715 A1 | 5/2020 | Liu et al. |
| 2020/0171394 A1 | 6/2020 | Khan et al. |
| 2020/0241575 A1 | 7/2020 | Meisenholder et al. |
| 2020/0242840 A1 | 7/2020 | Logan et al. |
| 2020/0257367 A1 | 8/2020 | Rihn et al. |
| 2020/0260149 A1 | 8/2020 | Ding et al. |
| 2020/0273243 A1 | 8/2020 | Duffy et al. |
| 2020/0279407 A1 | 9/2020 | Liljeroos et al. |
| 2020/0289935 A1 | 9/2020 | Azmandian et al. |
| 2020/0289941 A1 | 9/2020 | Khan et al. |
| 2020/0314323 A1 | 10/2020 | Van Geel et al. |
| 2020/0341541 A1 | 10/2020 | Olah-Reiken et al. |
| 2020/0349751 A1 | 11/2020 | Bentovim et al. |
| 2020/0371737 A1 | 11/2020 | Leppänen et al. |
| 2020/0394012 A1 | 12/2020 | Wright, Jr. et al. |
| 2020/0409451 A1 | 12/2020 | Mukherjea et al. |
| 2021/0096543 A1 | 4/2021 | Stump et al. |
| 2021/0142578 A1 | 5/2021 | Weinheimer et al. |
| 2021/0159980 A1 | 5/2021 | Ben-Yehuda et al. |
| 2021/0232632 A1 | 7/2021 | Howard |
| 2021/0272367 A1 | 9/2021 | Richter |
| 2021/0279962 A1 | 9/2021 | Hutten et al. |
| 2021/0286179 A1 | 9/2021 | Miller, IV et al. |
| 2021/0287452 A1 | 9/2021 | Maruyama |
| 2021/0289317 A1 | 9/2021 | Son et al. |
| 2021/0312684 A1 | 10/2021 | Zimmermann et al. |
| 2021/0327145 A1 | 10/2021 | Noorkami et al. |
| 2021/0362848 A1 | 11/2021 | Spencer |
| 2021/0374579 A1 | 12/2021 | Dotan-Cohen et al. |
| 2021/0382503 A1 | 12/2021 | Meisenholder et al. |
| 2021/0390953 A1 | 12/2021 | Makker et al. |
| 2021/0394046 A1 | 12/2021 | Yen et al. |
| 2021/0405772 A1 | 12/2021 | Canberk et al. |
| 2021/0407178 A1 | 12/2021 | Zhou et al. |
| 2021/0407208 A1 | 12/2021 | Hariton |
| 2021/0409502 A1 | 12/2021 | Chepizhenko et al. |
| 2022/0014723 A1 | 1/2022 | Pandey et al. |
| 2022/0028108 A1 | 1/2022 | Haapoja et al. |
| 2022/0028170 A1 | 1/2022 | Haapoja et al. |
| 2022/0053219 A1 | 2/2022 | Bathory |
| 2022/0101593 A1 | 3/2022 | Rockel et al. |
| 2022/0103969 A1 | 3/2022 | Drummond et al. |
| 2022/0108539 A1 | 4/2022 | Nussbaum et al. |
| 2022/0116581 A1 | 4/2022 | Miyata et al. |
| 2022/0124143 A1 | 4/2022 | Rafkind et al. |
| 2022/0139055 A1 | 5/2022 | Palmaro |
| 2022/0146833 A1 | 5/2022 | Miller, IV et al. |
| 2022/0164491 A1 | 5/2022 | Palmaro |
| 2022/0189075 A1* | 6/2022 | Lynch ............... G06T 11/00 |
| 2022/0197485 A1 | 6/2022 | Goodrich et al. |
| 2022/0198603 A1 | 6/2022 | Goodrich et al. |
| 2022/0230663 A1 | 7/2022 | Sun et al. |
| 2022/0242450 A1 | 8/2022 | Sokolov et al. |
| 2022/0244835 A1 | 8/2022 | Faulkner et al. |
| 2022/0247929 A1 | 8/2022 | Yang et al. |
| 2022/0269336 A1 | 8/2022 | Lafontaine et al. |
| 2022/0274026 A1 | 9/2022 | Steigelfest et al. |
| 2022/0362631 A1 | 11/2022 | Hong |
| 2022/0382255 A1 | 12/2022 | Lee |

(56) References Cited

U.S. PATENT DOCUMENTS

| | | |
|---|---|---|
| 2023/0010754 A1 | 1/2023 | Saxena |
| 2023/0063505 A1 | 3/2023 | Chastain et al. |
| 2023/0097571 A1 | 3/2023 | Mccain et al. |
| 2023/0139337 A1 | 5/2023 | Noam et al. |
| 2023/0173367 A1 | 6/2023 | Marty et al. |
| 2023/0179641 A1 | 6/2023 | Bauer et al. |
| 2023/0214005 A1 | 7/2023 | Ohashi |
| 2023/0214082 A1 | 7/2023 | Kang |
| 2023/0237192 A1 | 7/2023 | Kahan et al. |
| 2023/0316681 A1 | 10/2023 | Dolev et al. |
| 2023/0334754 A1 | 10/2023 | Kirchmayer et al. |
| 2023/0341928 A1 | 10/2023 | Traynor et al. |
| 2023/0342989 A1 | 10/2023 | Lehtiniemi et al. |
| 2023/0409114 A1 | 12/2023 | Sun et al. |
| 2023/0412480 A1 | 12/2023 | Greyson et al. |
| 2024/0005623 A1 | 1/2024 | Cooper et al. |
| 2024/0069626 A1 | 2/2024 | Vaish et al. |
| 2024/0069627 A1 | 2/2024 | Vaish et al. |
| 2024/0069637 A1 | 2/2024 | Vaish et al. |
| 2024/0070969 A1 | 2/2024 | Vaish et al. |
| 2024/0071004 A1 | 2/2024 | Vaish et al. |
| 2024/0071007 A1 | 2/2024 | Vaish et al. |
| 2024/0071008 A1* | 2/2024 | Vaish .................. G06V 10/945 |
| 2024/0073402 A1* | 2/2024 | Vaish .................. H04N 13/388 |
| 2024/0073404 A1 | 2/2024 | Vaish et al. |
| 2024/0119679 A1 | 4/2024 | Canberk et al. |
| 2024/0119682 A1 | 4/2024 | Rudman et al. |
| 2024/0233224 A1 | 7/2024 | Fan et al. |
| 2024/0273832 A1 | 8/2024 | Newman et al. |

FOREIGN PATENT DOCUMENTS

| | | |
|---|---|---|
| CN | 119790438 A | 4/2025 |
| JP | 2010061452 | 3/2010 |
| KR | 20200014587 | 2/2020 |
| KR | 20200109812 | 9/2020 |
| KR | 20210065423 | 6/2021 |
| KR | 20210135859 | 11/2021 |
| KR | 20220064130 A | 5/2022 |
| WO | 2016105839 | 6/2016 |
| WO | 2021002788 | 1/2021 |
| WO | 2024049687 | 3/2024 |
| WO | 2024049700 | 3/2024 |
| WO | 2024050229 | 3/2024 |
| WO | 2024050231 | 3/2024 |
| WO | 2024050232 | 3/2024 |
| WO | 2024050245 | 3/2024 |
| WO | 2024050246 | 3/2024 |
| WO | 2024050259 | 3/2024 |
| WO | 2024050264 | 3/2024 |
| WO | WO-2024050262 A1 | 3/2024 |

OTHER PUBLICATIONS

Laput, Gierad, "PixelTone: A Multimodal Interface for Image Editing", ACM, Proceedings of the SIGCHI Conference on Human Factors in Computing Systems, Paris, FR, (2013), 10 pgs.

Leyden, John, "This SMS will self-destruct in 40 seconds", [Online] Retrieved from the Internet: URL: http: www.theregister.co.uk 2005 12 12 stealthtext , (Dec. 12, 2005), 1 pg.

Meisenholder, David, "Remoteless Control of Drone Behavior", U.S. Appl. No. 15/640,143, filed Jun. 30, 2017, 108 pgs.

Pourmehr, Shokoofeh, "'You two! Take off!': Creating, Modifying, and Commanding Groups of Robots Using Face Engagement and Indirect Speech in Voice Commands", IEEE RSJ International Conference on Intelligent Robots and Systems (IROS), Tokyo, JP, (2013), 137-142.

Yamada, Wataru, "iSphere: Self-Luminous Spherical Drone Display", Proceedings of the 30th Annual ACM Symposium on User Interface Software and Technology (UIST), Quebec City, CA, (Oct. 22-25, 2017), 635-343.

"International Application Serial No. PCT/US2023/072718, International Search Report mailed Dec. 1, 2023", 3 pgs.

"International Application Serial No. PCT/US2023/072718, Written Opinion mailed Dec. 1, 2023", 4 pgs.

"U.S. Appl. No. 17/899,970, Non Final Office Action mailed Jul. 3, 2023", 22 pgs.

"U.S. Appl. No. 18/056,142, Non Final Office Action mailed Aug. 7, 2023", 12 pgs.

"U.S. Appl. No. 17/899,970, Response filed Oct. 3, 2023 to Non Final Office Action mailed Jul. 3, 2023", 11 pgs.

"U.S. Appl. No. 18/056,142, Response filed Nov. 7, 2023 to Non Final Office Action mailed Aug. 7, 2023", 11 pgs.

"U.S. Appl. No. 17/900,200, Non Final Office Action mailed Nov. 8, 2023", 26 pgs.

"U.S. Appl. No. 18/056,142, Examiner Interview Summary mailed Nov. 7, 2023", 2 pgs.

"U.S. Appl. No. 18/056,142, Notice of Non-Compliant Amendment mailed Nov. 16, 2023", 2 pgs.

"International Application Serial No. PCT US2023 072274, International Search Report mailed Nov. 28, 2023", 3 pgs.

"International Application Serial No. PCT US2023 072274, Written Opinion mailed Nov. 28, 2023", 4 pgs.

"International Application Serial No. PCT US2023 072568, International Search Report mailed Dec. 5, 2023", 3 pgs.

"International Application Serial No. PCT US2023 072568, Written Opinion mailed Dec. 5, 2023", 4 pgs.

"International Application Serial No. PCT US2023 072701, International Search Report mailed Dec. 1, 2023", 3 pgs.

"International Application Serial No. PCT US2023 072701, Written Opinion mailed Dec. 1, 2023", 4 pgs.

"International Application Serial No. PCT US2023 072282, International Search Report mailed Dec. 1, 2023", 4 pgs.

"International Application Serial No. PCT US2023 072282, Written Opinion mailed Dec. 1, 2023", 4 pgs.

"International Application Serial No. PCT US2023 072277, International Search Report mailed Dec. 8, 2023", 4 pgs.

"International Application Serial No. PCT US2023 072277, Written Opinion mailed Dec. 8, 2023", 4 pgs.

"International Application Serial No. PCT US2023 030926, International Search Report mailed Dec. 12, 2023", 3 pgs.

"International Application Serial No. PCT US2023 030926, Written Opinion mailed Dec. 12, 2023", 4 pgs.

"International Application Serial No. PCT US2023 072557, International Search Report mailed Dec. 12, 2023", 3 pgs.

"International Application Serial No. PCT US2023 072557, Written Opinion mailed Dec. 12, 2023", 4 pgs.

"International Application Serial No. PCT US2023 072726, International Search Report mailed Dec. 12, 2023", 3 pgs.

"International Application Serial No. PCT US2023 072726, Written Opinion mailed Dec. 12, 2023", 4 pgs.

"International Application Serial No. PCT US2023 031066, International Search Report mailed Dec. 15, 2023", 3 pgs.

"International Application Serial No. PCT US2023 031066, Written Opinion mailed Dec. 15, 2023", 3 pgs.

"U.S. Appl. No. 17/899,970, Notice of Allowance mailed Dec. 20, 2023", 9 pgs.

"U.S. Appl. No. 17/899,970, Corrected Notice of Allowability mailed Jan. 3, 2024", 5 pgs.

"U.S. Appl. No. 18/056,142, Response filed Jan. 3, 2024 to Notice of Non-Compliant Amendment mailed Nov. 16, 2023", 11 pgs.

"U.S. Appl. No. 17/900,200, Response filed Jan. 31, 2024 to Non Final Office Action mailed Nov. 8, 2023", 14 pgs.

"U.S. Appl. No. 17/900,407, Non Final Office Action mailed Feb. 9, 2024", 11 pgs.

"U.S. Appl. No. 17/899,970, 312 Amendment filed Mar. 20, 2024", 7 pgs.

"U.S. Appl. No. 17/899,970, PTO Response to Rule 312 Communication mailed Mar. 27, 2024", 1 page.

"U.S Appl. No. 17/899,970, Supplemental Notice of Allowability mailed Mar. 27, 2024", 2 pgs.

"U.S. Appl. No. 18/056,142, Final Office Action mailed Apr. 8, 2024", 15 pgs.

"U.S. Appl. No. 17/900,407, Examiner Interview Summary mailed Apr. 15, 2024", 2 pgs.

(56) References Cited

OTHER PUBLICATIONS

"U.S. Appl. No. 17/900,407, Response filed Apr. 23, 2024 to Non Final Office Action mailed Feb. 9, 2024", 12 pgs.
"U.S. Appl. No. 17/900,200, Final Office Action mailed May 6, 2024", 32 pgs.
"U.S. Appl. No. 17/899,935, Non Final Office Action mailed Jun. 6, 2024", 13 pgs.
"U.S. Appl. No. 18/056,142, Response filed Jul. 8, 2024 to Final Office Action mailed Apr. 8, 2024", 13 pgs.
Ko, Jonggook, "Hybrid Camera Based Real-Time Human Body Segmentation for Virtual Reality E-learning System", First ACIS JNU International Conference on Computers Networks Systems and Industrial Engineering Jeju Korea South, (2011), 3 pgs.
Langa, Sergi Fernandez, "Multiparty Holomeetings Toward a New Era of Low Cost Volumetric Holographic Meetings in Virtual Reality", IEEE Access vol. 10, (Aug. 3, 2022), 21 pgs.
"U.S. Appl. No. 17/899,935, Response filed Oct. 7, 2024 to Non Final Office Action mailed Jun. 6, 2024", 11 pgs.
"U.S. Appl. No. 17/900,200, Non Final Office Action mailed Aug. 29, 2024", 35 pgs.
"U.S. Appl. No. 17/900,200, Response filed Aug. 6, 2024 to Final Office Action mailed May 6, 2024", 13 pgs.
"U.S. Appl. No. 17/900,407, Final Office Action mailed Aug. 21, 2024", 14 pgs.
"U.S. Appl. No. 17/900,407, Response filed Oct. 18, 2024 to Final Office Action mailed Aug. 21, 2024", 12 pgs.
"U.S. Appl. No. 17/900,436, Non Final Office Action mailed Sep. 23, 2024", 12 pgs.
"U.S. Appl. No. 18/056,142, Corrected Notice of Allowability mailed Sep. 4, 2024", 2 pgs.
"U.S. Appl. No. 18/056,142, Notice of Allowance mailed Aug. 16, 2024", 9 pgs.
"U.S. Appl. No. 18/169,631, Non Final Office Action mailed Sep. 17, 2024", 28 pgs.
S. A., Aseeri, et al., "The Influence of Avatar Representation and Behavior on Communication in Social Immersive Virtual Environments", IEEE Conference on Virtual Reality and 3D User Interfaces VR Tuebingen Reutlingen Germany, (2018), 2 pgs.
Yanbin, Wang, et al., "Real Time Stereoscopic Rendering of Realistic Avatar for Interactive 3D Telepresence System", 2nd International Conference on Image Vision and Computing ICIVC Chengdu, (2017), 5 pgs.
"U.S. Appl. No. 17/900,407, Advisory Action mailed Oct. 30, 2024", 3 pgs.
"U.S. Appl. No. 17/900,407, Notice of Allowance mailed Nov. 27, 2024", 8 pgs.
"U.S. Appl. No. 17/900,200, Response filed Nov. 27, 2024 to Non Final Office Action mailed Aug. 29, 2024", 13 pgs.
"U.S. Appl. No. 18/170,271, Non Final Office Action mailed Nov. 29, 2024", 11 pgs.
"U.S. Appl. No. 18/056,142, Notice of Allowance mailed Dec. 11, 2024", 5 pgs.
"U.S. Appl. No. 17/900,354, Non Final Office Action mailed Dec. 12, 2024", 17 pgs.
"U.S. Appl. No. 18/169,631, Response filed Dec. 17, 2024 to Non Final Office Action mailed Sep. 17, 20024", 11 pgs.
"International Application Serial No. PCT/US2023/072718, International Preliminary Report on Patentability mailed Mar. 13, 2025", 6 pgs.
"U.S. Appl. No. 17/899,935, Non Final Office Action mailed Apr. 17, 2025", 14 pgs.
"U.S. Appl. No. 17/899,935, Response filed Apr. 9, 2025 to Final Office Action mailed Jan. 10, 2025", 10 pgs.
"U.S. Appl. No. 17/900,200, Final Office Action mailed Mar. 3, 2025", 39 pgs.
"U.S. Appl. No. 17/900,354, Response filed Mar. 12, 2025 to Non Final Office Action mailed Dec. 12, 2024", 10 pgs.
"U.S. Appl. No. 17/900,436, Final Office Action mailed Apr. 10, 2025", 14 pgs.
"U.S. Appl. No. 18/056,142, Corrected Notice of Allowability mailed Mar. 12, 2025", 2 pgs.
"U.S. Appl. No. 18/056,142, Corrected Notice of Allowability mailed Mar. 26, 2025", 2 pgs.
"U.S. Appl. No. 18/169,631, Final Office Action mailed Mar. 10, 2025", 28 pgs.

* cited by examiner

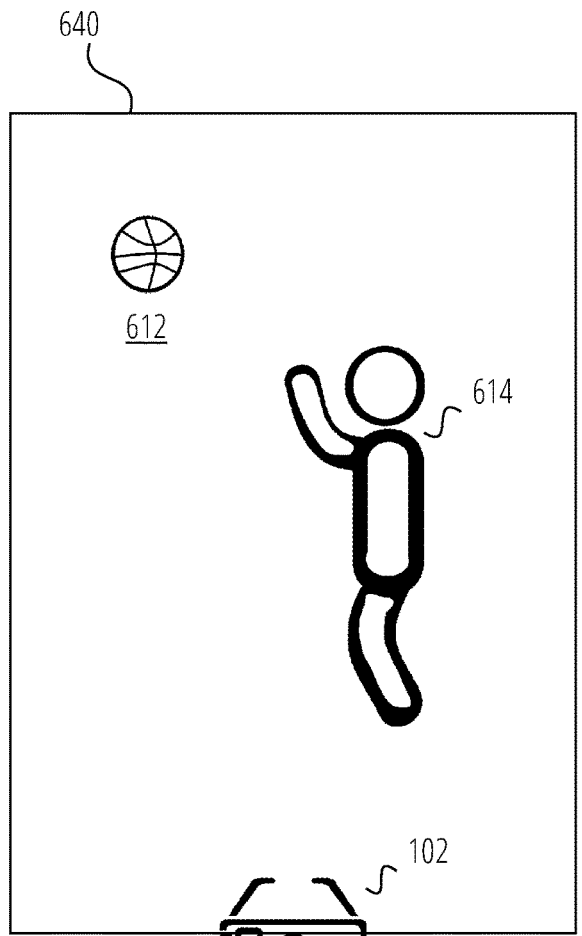
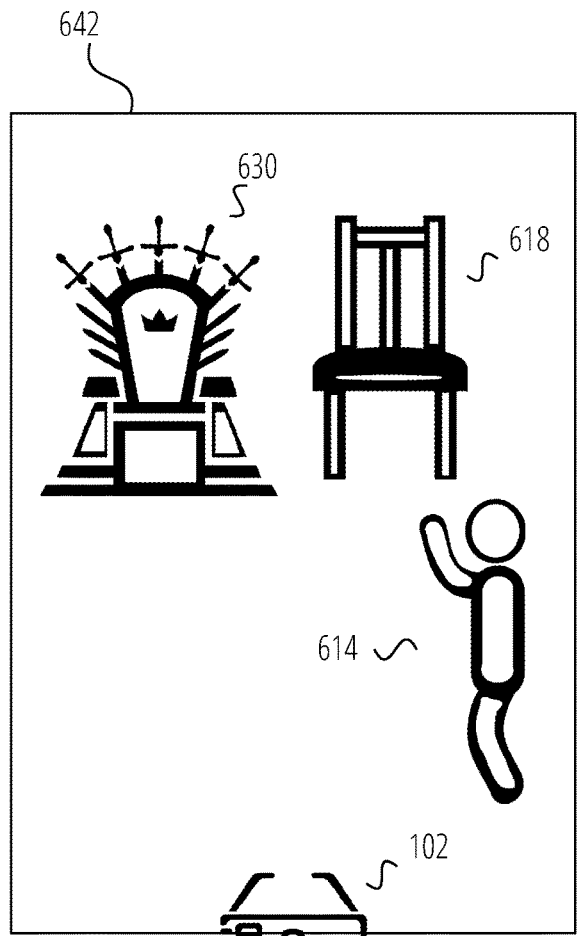
FIG. 6G
FIG. 6H

MIXING AND MATCHING VOLUMETRIC CONTENTS FOR NEW AUGMENTED REALITY EXPERIENCES

CROSS-REFERENCE TO RELATED APPLICATION

This patent application claims the benefit of U.S. Provisional Patent Application No. 63/402,604, filed Aug. 31, 2022, entitled "MIXING AND MATCHING VOLUMETRIC CONTENTS FOR NEW AUGMENTED REALITY EXPERIENCES", which is incorporated by reference herein in its entirety.

TECHNICAL FIELD

The present disclosure generally relates to mobile and wearable computing technology. In particular, example embodiments of the present disclosure address systems, methods, and user interfaces for mixing and matching volumetric content items to create new augmented reality experiences.

BACKGROUND

An augmented reality (AR) experience includes application of virtual content to a real-world environment whether through presentation of the virtual content by transparent or semi-transparent displays through which a real-world environment is visible or through augmenting image data to include the virtual content overlaid on real-world environments depicted therein. The virtual content can comprise one or more AR content items. An AR content item may include audio content, visual content, visual effect, or objects (e.g., virtual objects such as 3D renderings, images, video, text, and so forth) that are generated for display to appear as a part of, and/or overlaid upon, the surrounding environment. A device that supports AR experiences in any one of these approaches is referred to herein as a "display device."

For some example AR devices, audio and visual content or the visual effects are applied to media data such as a live image stream. Other example AR devices include head-worn devices that may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as 3D renderings, images, video, text, and so forth) that are generated for display to appear as a part of, and/or overlaid upon, the surrounding environment to provide an augmented reality experience to the user. A user of the head-worn device may access and use a computer software Application to perform various tasks or engage in an entertaining activity. To use the computer software Application, the user interacts with a 3D user interface provided by the head-worn device.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 6G is a conceptual diagram illustrating an example for presentation of a volumetric content item, in accordance with example embodiments.

FIG. 6H is a conceptual diagram illustrating an example for presentation of a volumetric content item, in accordance with example embodiments.

DETAILED DESCRIPTION

Figure 1:
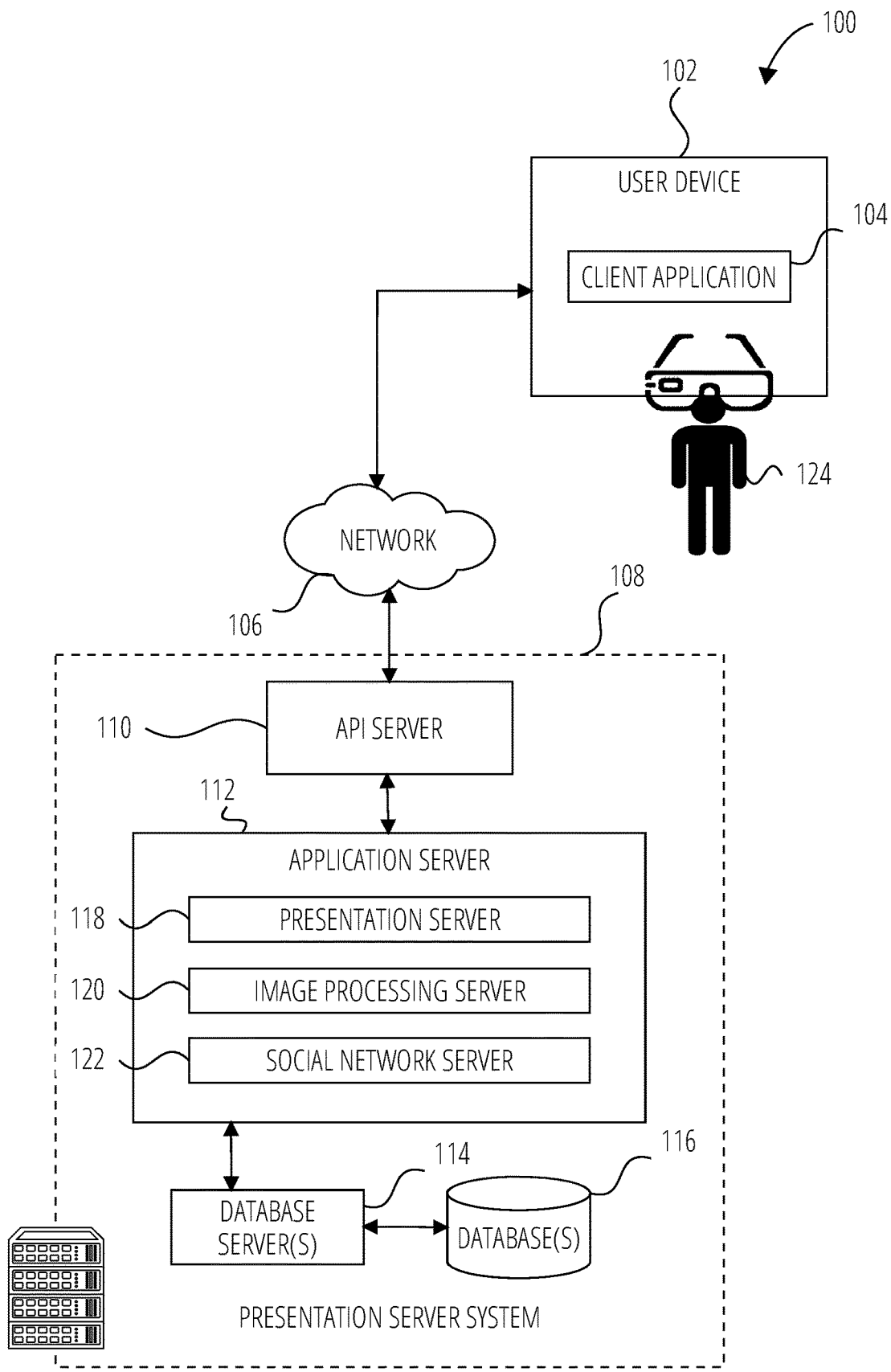
FIG. 1 is a diagrammatic representation of a networked environment in which a volumetric content presentation system may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Volumetric content is an example of an augmented reality (AR) experience. Volumetric content can include volumetric videos and images of three-dimensional spaces captured in three-dimensions (as well as audio signals recorded with volumetric videos and images). Recording of volumetric content includes volumetrically capturing elements of the three-dimensional space such as objects and human beings using a combination of cameras and sensors. Volumetric content includes a volumetric representation of one or more three-dimensional elements (e.g., an object or a person) of a three-dimensional space. A volumetric representation of an element (e.g., an AR content item) refers to a visual representation of the three-dimensional element in three-dimensions. The presentation of the volumetric content may include displaying one or more AR content items overlaid upon a real-world space, which may be the same as the three-dimensional space in which the volumetric video was captured or a different space. The presentation of the volumetric content may include displaying one or more content items in motion, displaying one or more content items performing a movement or other action, displaying one or more content items statically positioned, or combinations thereof. A content item may be displayed for a duration of the presentation of the volumetric content or a portion thereof.

The presentation of the volumetric content may include tracking a location and movement of a user within their physical real-world environment and using the tracked location and movement of the user to allow the user to move around in and interact with the presentation of the volumetric content. As such, the presentation of the volumetric content may include displaying a content item from multiple perspectives depending on a user's movement and change in location. In this manner, the presentation of volumetric content provides an immersive AR experience to users. Conventional volumetric content systems lack mechanisms to enable creation of new volumetric content using existing elements of volumetric content.

Aspects of the present disclosure include systems, methods, techniques, instruction sequences, and computing machine program products system to enable users to mix and match volumetric content items from existing volumetric content to create new augmented reality experiences. That is, a volumetric content presentation system can obtain one or more volumetric content items from existing volumetric videos or images and present them as an overlay on a real-world environment as part of a new augmented reality experience. In addition, the volumetric content presentation system enables new volumetric content to be created based on a combination of volumetric content items obtained from existing volumetric content.

In an example, volumetric capture techniques are used to generate volumetric content that depicts a motion scene of a person sitting on a chair. Machine learning models are used to segment the chair and the person from image data generated during the volumetric capture. That is, a first model is used to segment the chair and a second model is used to segment the person. Together, the two models create a volumetric scene of a person sitting on a chair in AR. The volumetric content presentation system described herein allows a user to disintegrate an AR scene like building blocks (e.g. person and chair) and create new augmented experiences. In a first illustrative example, a user can create an augmented reality experience in which a first volumetric content item corresponding to the chair (e.g., a volumetric representation of the chair) and a second volumetric content item corresponding person are presented as an overlay on a real-world environment, which may correspond to the location where the volumetric capture was performed or any other location such as a park, on a desk or on top of a building. This enables the user to engage with the augmented reality experience anywhere.

In a second illustrative example, a user can create an AR experience in which the volumetric representation of the person is overlaid on a real-world chair. The volumetric content presentation system can use an object-based trigger for presentation of the volumetric representation of the person overlaid on the chair. The user can place the volumetric representation of the person on the same real-world chair where the volumetric scene was captured or any chair, allowing flexibility and creative use of the volumetric representation of the person. Having AR content seamlessly and semantically connects with the physical world in this manner highlights the experience and makes it more contextual. Placing a volumetric representation of the person sitting on a volumetric representation of the chair at a random location loses the original context of the volumetric content, but bringing the volumetric representation of the person on the real-world chair adds context again. In this manner, the volumetric content presentation system provides multiple choices to people to use volumetrically captured scene in any way they desire.

In a third illustrative example, a user can use the volumetric representation of the chair as a collectible or create new content using it. A real person can pose next to the volumetric representation of the chair and create new experiences that are different than the experience depicted in the original volumetric content.

In a fourth illustrative example, a user can place the volumetric representation of the person on a desk and a volumetric representation of the chair in a garden. In this way, the AR components (i.e., the volumetric representations of the persona and the chair) can be separated and placed anywhere a user wants. Taking a picture next to the AR scene can enable creation of new memories, and even fill the gap when the real person is not available (as if they were there). For instance, in a group photo with the person missing, the user can add in the volumetric representation of the user to complete the group.

As used herein, the phrase "augmented reality experience," includes or refers to various image processing operations corresponding to an image modification, filter, media overlay, transformation, and the like, as described further herein. In some examples, these image processing operations provide an interactive experience of a real-world environment, where objects, surfaces, backgrounds, lighting and so forth in the real-world are enhanced by computer-generated perceptual information. In this context an "augmented reality effect" comprises the collection of data, parameters, and other assets used to apply a selected augmented reality experience to an image or a video feed. In some examples, augmented reality effects are provided by Snap, Inc. under the registered trademark LENSES.

In some examples, a user's interaction with software Applications executing on an AR device is achieved using a 3D User Interface. The 3D user interface includes virtual objects displayed to a user by the AR device in a 3D render displayed to the user. In the case of AR, the user perceives the virtual objects as objects within an overlay in the user's field of view of the real-world while wearing the AR device. In the case of VR, the user perceives the virtual objects as objects within the virtual world as viewed by the user while wearing the AR device. To allow the user to interact with the virtual objects, the AR device detects the user's hand positions and movements and uses those hand positions and movements to determine the user's intentions in manipulating the virtual objects.

Generation of the 3D user interface and detection of the user's interactions with the virtual objects may also include detection of real-world objects (e.g., faces, hands, bodies, cats, dogs, surfaces, objects), tracking of such real-world objects as they leave, enter, and move around the field of view in video frames, and the modification or transformation of such real-world objects as they are tracked. In various examples, different methods for detecting the real-world objects and achieving such transformations may be used. For example, some examples may involve generating a 3D mesh model of a real-world object or real-world objects, and using transformations and animated textures of the model within the video frames to achieve the transformation. In other examples, tracking of points on a real-world object may be used to place an image or texture, which may be two dimensional or three dimensional, at the tracked position. In still further examples, neural network analysis of video frames may be used to place images, models, or textures in content (e.g., images or frames of video). AR effect data thus may include both the images, models, and textures used to create transformations in content, as well as additional modeling and analysis information used to achieve such transformations with real-world object detection, tracking, and placement.

FIG. 1 is a block diagram showing an example volumetric content presentation system 100 for presenting volumetric content. The volumetric content presentation system 100 includes of a user device 102. The user device 102 hosts a number of applications including a client application 104. Each client application 104 is communicatively coupled to a presentation server system 108 via a network 106 (e.g., the Internet). In an example, the user device 102 is a wearable device (e.g., smart glasses) worn by the user 124 that includes a camera and optical elements that include a transparent display through which the real-world environment is visible to the user 124.

A client application 104 is able to communicate and exchange data with another client application 104 and with the presentation server system 108 via the network 106. The data exchanged between the client application 104, and between another client application 104 and the presentation server system 108, includes functions (e.g., commands to invoke functions) as well as payload data (e.g., text, audio, video or other multimedia data).

The presentation server system 108 provides server-side functionality via the network 106 to a client application 104. While certain functions of the volumetric content presentation system 100 are described herein as being performed by either a client application 104 or by the presentation server system 108, the location of certain functionality either within the client application 104 or the presentation server system 108 is a design choice. For example, it may be technically preferable to initially deploy certain technology and functionality within the presentation server system 108, but to later migrate this technology and functionality to the client application 104 where the client device (102) has a sufficient processing capacity.

The presentation server system 108 supports various services and operations that are provided to the client application 104. Such operations include transmitting data to, receiving data from, and processing data generated by the client application 104. This data may include, volumetric content (e.g., volumetric videos), message content, device information, geolocation information, media annotation and overlays, message content persistence conditions, social network information, and live event information, as examples. Data exchanges within the volumetric content presentation system 100 are invoked and controlled through functions available via user interfaces (UIs) and of the client application 104.

Turning now specifically to the presentation server system 108, an Application Program Interface (API) server 110 is coupled to, and provides a programmatic interface to, an Application server 112. The Application server 112 is communicatively coupled to a database server 114, which facilitates access to a database 116 in which is stored data associated with messages processed by the Application server 112.

The Application Program Interface (API) server 110 receives and transmits message data (e.g., commands and message payloads) between the user device 102 and the application server 112. Specifically, the Application Program Interface (API) server 110 provides a set of interfaces (e.g., routines and protocols) that can be called or queried by the client application 104 in order to invoke functionality of the application server 112. The API Application Program Interface (API) server 110 exposes various functions supported by the application server 112, including account registration, login functionality, the sending of messages, via the application server 112, from a client application 104 to another client application 104, the sending of media files (e.g., volumetric videos) to the client application 104, the setting of a collection of media data (e.g., story), the retrieval of a list of friends of a user 124 of a user device 102, the retrieval of such collections, the retrieval of messages and content, the adding and deletion of friends to a social graph, the location of friends within a social graph, and opening an application event (e.g., relating to the client application 104).

The application server 112 hosts a number of applications and subsystems, including a presentation server 118, an image processing server 120 and a social network server 122. The application server 112 is generally responsible for managing volumetric content and facilitating presentation thereof by the user device 102. The image processing server 120 is dedicated to performing various image processing operations, typically with respect to images or video generated and displayed by the user device 102. The application server 112 and image processing server 120 may work in conjunction to provide one or more AR experiences to the user 124. For example, the application server 112 and image processing server 120 may work in conjunction to support presentation of volumetric content by the client device 102. Further details regarding presentation of volumetric content are discussed below.

The social network server 122 supports various social networking functions and services, and makes these functions and services available to the application server 112. To this end, the social network server 122 maintains and accesses an entity graph within the database 116. Examples of functions and services supported by the social network server 122 include the identification of other users of the volumetric content presentation system 100 with which a particular user has relationships or is "following", and also the identification of other entities and interests of a particular user.

The application server 112 is communicatively coupled to a database server 114, which facilitates access to a database 116 in which is stored data associated with content presented by the presentation server 112 and image processing server 120.

Figure 2A:
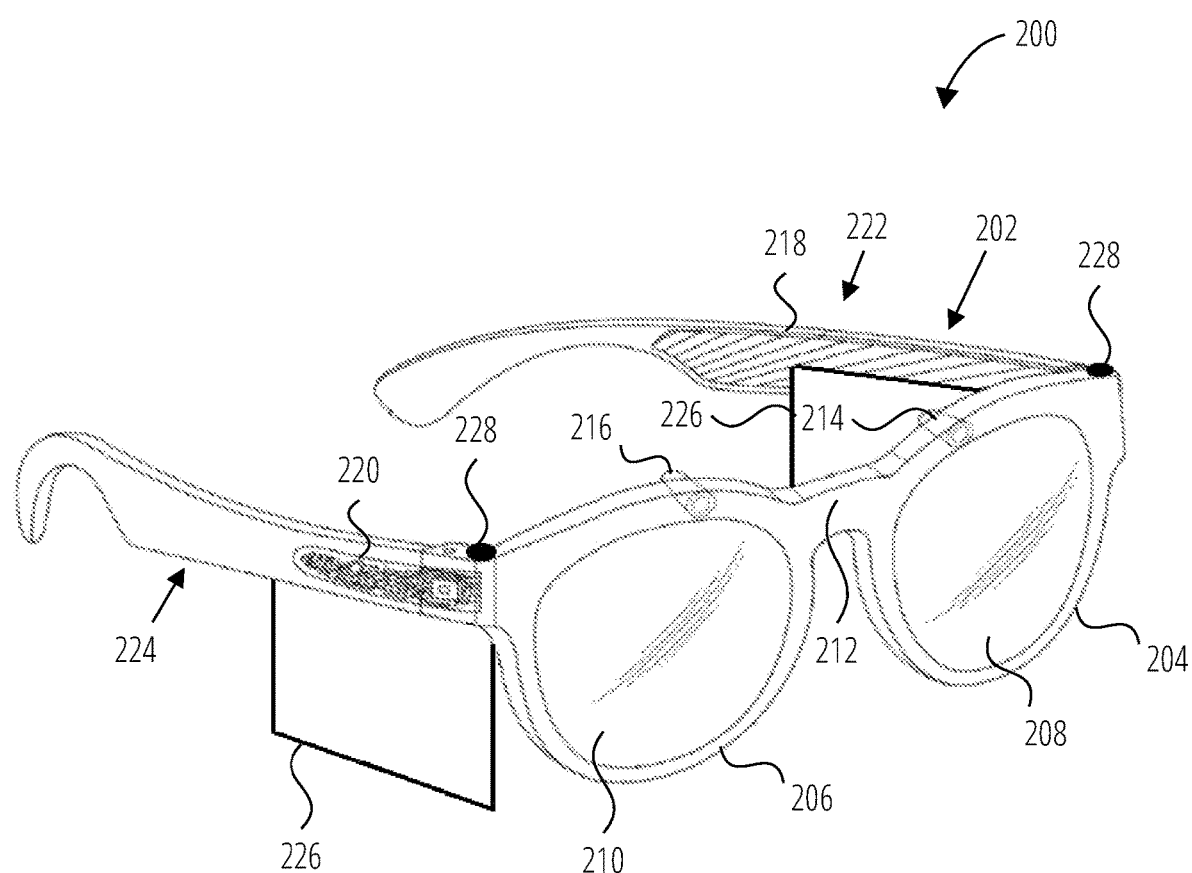
FIG. 2A is a perspective view of a head-worn device, in accordance with some examples.

FIG. 2A is a diagram illustrating a wearable device in the example form of glasses 200, according to some example embodiments. The glasses 200 are an example of the user device 102 of FIG. 1. The glasses 200 are capable of displaying content and are thus an example of a display device, which is referenced below. In addition, the display capabilities of the glasses 200 support AR experiences and the glasses 200 are thus an example of an AR device. As noted above, AR experiences include application of virtual content to real-world environments whether through presentation of the virtual content by transparent displays through which a real-world environment is visible or through augmenting image data to include the virtual content overlaid on real-world environments depicted therein. Further details regarding AR content items are discussed below.

The glasses 200 can include a frame 202 made from any suitable material such as plastic or metal, including any suitable shape memory alloy. In one or more examples, the frame 202 includes a first or left optical element holder 204 (e.g., a display or lens holder) and a second or right optical element holder 206 connected by a bridge 212. A first or left optical element 208 and a second or right optical element 210 can be provided within respective left optical element holder 204 and right optical element holder 206. The right optical element 210 and the left optical element 208 can be a lens, a display, a display assembly, or a combination of the foregoing.

For example, the glasses 200 can include an inward-facing display component comprising an integrated near-eye display mechanism that enables, for example, display to the user of preview images for visual media captured by left camera 214 and/or right camera 216 of the glasses 200. The integrated near-eye display mechanism also facilitates AR experiences such as presentation of volumetric videos by displaying AR content such that it is overlaid on a real-world environment that is viewable through the left optical element 208 and the right optical element 210. An AR content item may include audio content, visual content or a visual effect. Examples of audio and visual content include pictures, texts, logos, animations, and sound effects. The audio and visual content or the visual effects can be applied to media data such as a live image stream.

The frame 202 additionally includes a left arm or left temple piece 222 and a right arm or right temple piece 224 coupled to the respective left optical element holder 204 and right optical element holder 206 by any suitable means, such as one or more hinges 228. In some examples the frame 202 can be formed from a single piece of material so as to have a unitary or integral construction.

The glasses 200 can include a computing device, such as a computer 220, which can be of any suitable type so as to be carried by the frame 202 and, in one or more examples, of a suitable size and shape, so as to be partially disposed in one of the left temple piece 222 or the right temple piece 224. The computer 220 can include one or more processors with memory, wireless communication circuitry, and a power source. The computer 220 comprises low-power circuitry, high-speed circuitry, and a display processor. Various other examples may include these elements in different configurations or integrated together in different ways.

The computer 220 additionally includes a battery 218 or other suitable portable power supply. In some examples, the battery 218 is disposed in left temple piece 222 and is electrically coupled to the computer 220 disposed in the right temple piece 224. The glasses 200 can include a connector or port (not shown) suitable for charging the battery 218, a wireless receiver, transmitter or transceiver (not shown), or a combination of such devices.

The glasses 200 include a first or left camera 214 and a second or right camera 216. Although two cameras are depicted, other examples contemplate the use of a single or additional (i.e., more than two) cameras. In one or more examples, the glasses 200 include any number of input sensors or other input/output devices in addition to the left camera 214 and the right camera 216. Such sensors or input/output devices can additionally include biometric sensors, location sensors, motion sensors, and so forth.

In some examples, the left camera 214 and the right camera 216 provide volumetric content for use by the glasses 200, or the application server 112 to extract volumetric content item a real-world three-dimensional environment.

The glasses 200 may also include a touchpad 226 mounted to or integrated with one or both of the left temple piece 222 and right temple piece 224. The touchpad 226 is generally vertically-arranged, approximately parallel to a user's temple in some examples. As used herein, generally vertically aligned means that the touchpad is more vertical than horizontal, although potentially more vertical than that. The one or more touchpads 226 provide a means whereby the glasses 200 can receive input from a user 124 of the glasses 200.

In various examples, the glasses 200 may include any number of input sensors or peripheral devices in addition to the left camera 214 and the right camera 216. Such sensors can include inward-facing video sensors or digital imaging modules such as cameras that can be mounted on or provided within the inner surface or elsewhere on the frame 202 so as to be facing the user, and outward-facing video sensors or digital imaging modules such as the left cameras 214 and the right camera 216 that can be mounted on or provided with the outer surface or elsewhere on the frame 202 so as to be facing away from the user. Such sensors, peripheral devices, or peripherals can additionally include biometric sensors, location sensors, accelerometers, or any other such sensors.

Figure 2B:
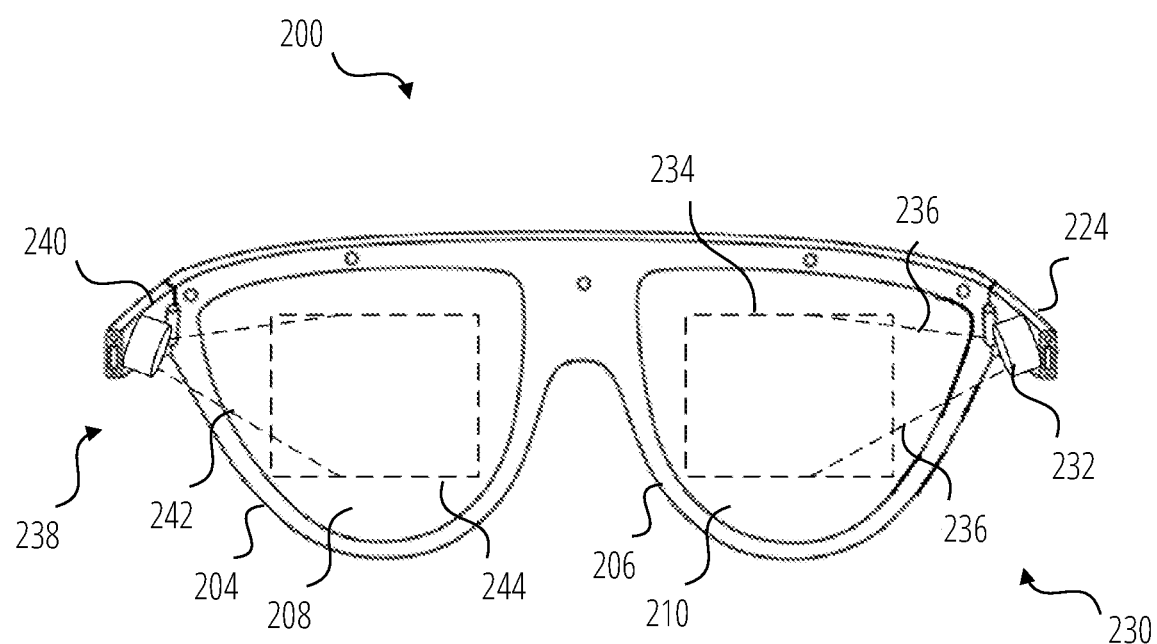
FIG. 2B illustrates a further view of the head-worn device of FIG. 2A, in accordance with some examples.

FIG. 2B illustrates the glasses 200 from the perspective of a user. For clarity, a number of the elements shown in FIG. 2A have been omitted. As described in FIG. 2A, the glasses 200 shown in FIG. 2B include left optical element 208 and right optical element 210 secured within the left optical element holder 204 and the right optical element holder 206 respectively.

The glasses 200 include forward optical assembly 230 comprising a right projector 232 and a right near eye display 234, and a forward optical assembly 238 including a left projector 240 and a left near eye display 244.

In some examples, the near eye displays are waveguides. The waveguides include reflective or diffractive structures (e.g., gratings and/or optical elements such as mirrors, lenses, or prisms). Light 236 emitted by the right projector 232 encounters the diffractive structures of the waveguide of the near eye display 234, which directs the light towards the right eye of a user to provide an image on or in the right optical element 210 that overlays the view of the real-world seen by the user. Similarly, light 242 emitted by the projector 240 encounters the diffractive structures of the waveguide of the near eye display 244, which directs the light towards the left eye of a user to provide an image on or in the left optical element 208 that overlays the view of the real-world seen by the user. The combination of a GPU, the forward optical assembly 230, the left optical element 208, and the right optical element 210 provide an optical engine of the glasses 200. The glasses 200 use the optical engine to generate an overlay of the real-world view of the user including display of a volumetric user interface to the user of the glasses 200.

It will be appreciated however that other display technologies or configurations may be utilized within an optical engine to display an image to a user in the user's volumetric content 622. For example, instead of a projector 232 and a waveguide, an LCD, LED or other display panel or surface may be provided.

In use, a user of the glasses 200 will be presented with information, various volumetric content, and a user interfaces on the near eye displays. As described in more detail herein, the user can then interact with the glasses 200 using a touchpad 226, voice inputs or touch inputs, and/or hand movements, locations, and positions detected by the glasses 200.

Figure 3:
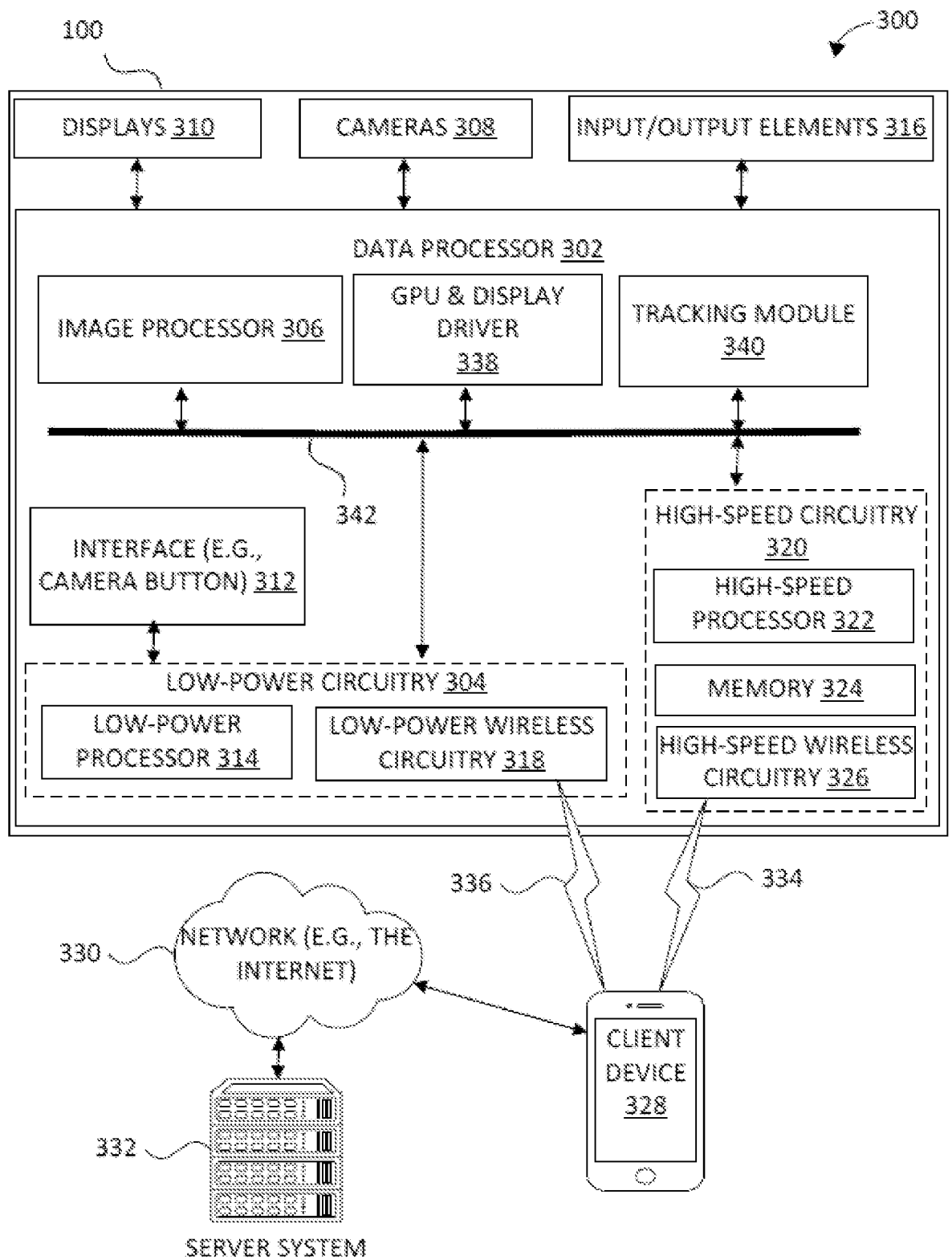
FIG. 3 is a block diagram illustrating a networked system including details of the head-worn device of FIG. 1, in accordance with some example embodiments.

FIG. 3 is a block diagram illustrating a networked system 300 including details of the glasses 200, in accordance with some examples. The networked system 300 includes the glasses 200, a client device 328, and a server system 332. The client device 328 may be a smartphone, tablet, phablet, laptop computer, access point, or any other such device capable of connecting with the glasses 200 using a low-power wireless connection 336 and/or a high-speed wireless connection 334. The client device 328 is connected to the server system 332 via the network 330. The network 330 may include any combination of wired and wireless connections. The server system 332 may be one or more computing devices as part of a service or network computing system. The client device 328 and any elements of the server system 332 and network 330 may be implemented using details of the software architecture 802 or the machine 900 described in FIG. 8 and FIG. 8 respectively.

The glasses 200 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 7A and FIG. 8. For example, the input/output elements 316 may include any of I/O components 810 including output components, motion components 930, and so forth. Examples of the displays 310 are discussed in FIG. 2B. In the particular examples described herein, the displays 310 include a display for the user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In some examples, the interface 312 may be any mechanical switch or physical interface capable of accepting user inputs associated with a request for data from the cameras 308. In other examples, the interface 312 may have a software component, or may be associated with a command received wirelessly from another source, such as from the client device 328.

The image processor 306 includes circuitry to receive signals from the cameras 308 and process those signals from the cameras 308 into a format suitable for storage in the memory 324 or for transmission to the client device 328. In one or more examples, the image processor 306 (e.g., video processor) comprises a microprocessor integrated circuit (IC) customized for processing sensor data from the cameras 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 200. As described above, for example, the low-power processor 314 may accept user input signals from the interface 312. The low-power processor 314 may also be configured to receive input signals or instruction communications from the client device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system used for the data processor 302. The high-speed processor 322 includes processing resources used for managing high-speed data transfers on the high-speed wireless connection 334 using the high-speed wireless circuitry 326. In some examples, the high-speed processor 322 executes an operating system such as a LINUX operating system or other such operating system. In addition to any other responsibilities, the high-speed processor 322 executing a software architecture for the data processor 302 is used to manage data transfers with the high-speed wireless circuitry 326. In some examples, the high-speed wireless circuitry 326 is configured to implement Institute of Electrical and Electronic Engineers (IEEE) 802.11 communication standards, also referred to herein as Wi-Fi. In other examples, other high-speed communications standards may be implemented by the high-speed wireless circuitry 326.

The memory 324 includes any storage device capable of storing camera data generated by the cameras 308 and the image processor 306. While the memory 324 is shown as integrated with the high-speed circuitry 320, in other examples, the memory 324 may be an independent stand-alone element of the data processor 302. In some such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is desired.

The tracking module 340 estimates a pose of the glasses 200. For example, the tracking module 340 uses image data and corresponding inertial data from the cameras 308 and the position components 934, as well as GPS data, to track a location and determine a pose of the glasses 200 relative to a frame of reference (e.g., real-world environment). The tracking module 340 continually gathers and uses updated sensor data describing movements of the glasses 200 to determine updated three-dimensional poses of the glasses 200 that indicate changes in the relative position and orientation relative to physical objects in the real-world environment. The tracking module 340 permits visual placement of virtual objects relative to physical objects by the glasses 200 within the field of view of the user via the displays 310.

The GPU & display driver 338 may use the pose of the glasses 200 to generate frames of virtual content or other content to be presented on the displays 310 when the glasses 200 are functioning in a traditional augmented reality mode. In this mode, the GPU & display driver 338 generates updated frames of virtual content based on updated three-dimensional poses of the glasses 200, which reflect changes in the position and orientation of the user in relation to physical objects in the user's real-world environment.

One or more functions or operations described herein may also be performed in an application resident on the glasses 200 or on the client device 328, or on a remote server. The glasses 200 may be a stand-alone client device that is capable of independent operation or may be a companion device that works with a primary device to offload intensive processing and/or exchange data over the network 106 with the presentation server system 108. The glasses 200 may also be communicatively coupled with a companion device such as a smart watch and may be configured to exchange data with the companion device. The glasses 200 may further include various components common to mobile electronic devices such as smart glasses or smart phones (for example, including a display controller for controlling display of visual media on a display mechanism incorporated in the device).

Figure 4:
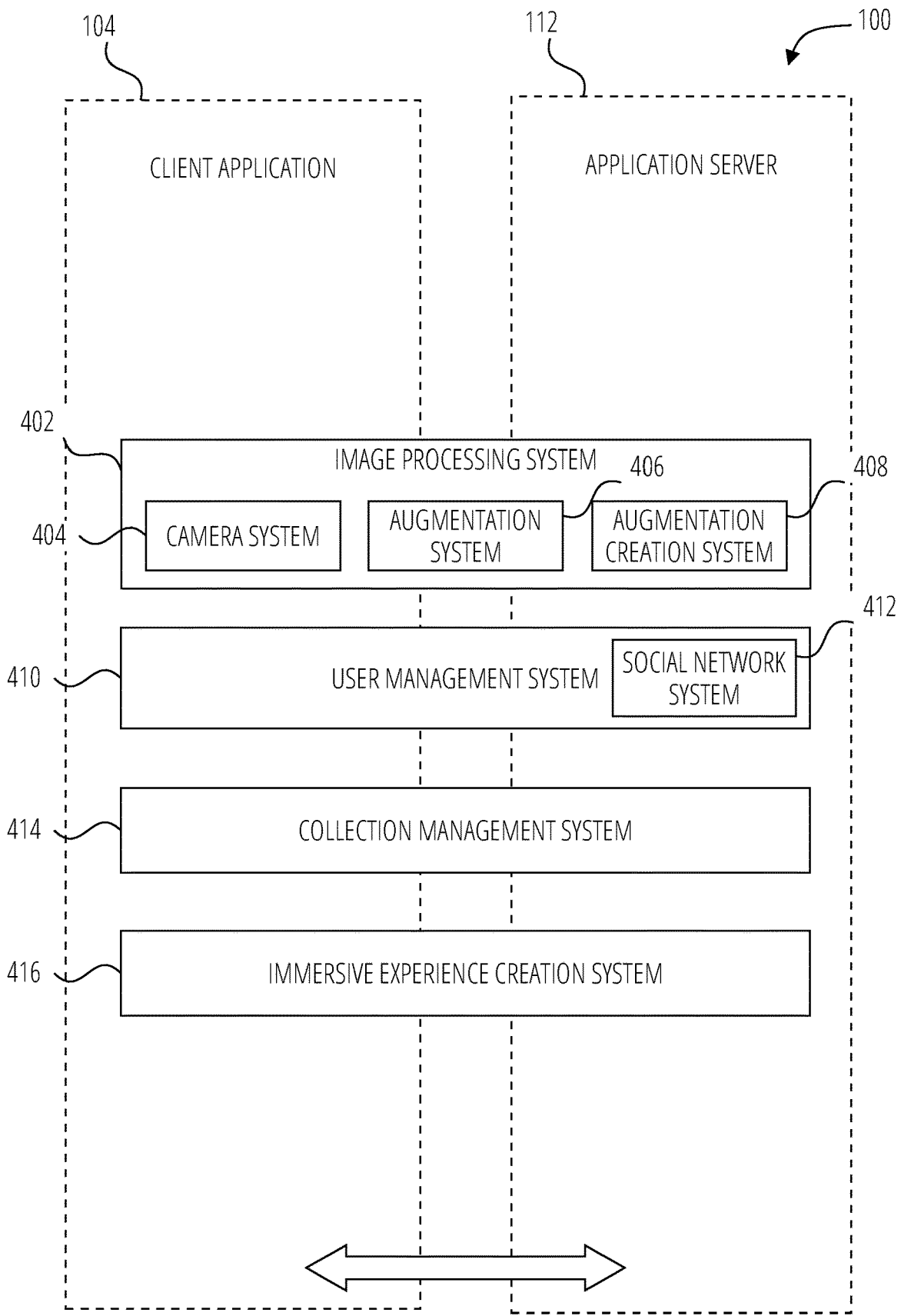
FIG. 4 is a diagrammatic representation of a volumetric content presentation system, in accordance with some examples, that has both client-side and server-side functionality.

FIG. 4 is a block diagram illustrating further details regarding the volumetric content presentation system 100, according to some examples. Specifically, the volumetric content presentation system 100 is shown to comprise the client application 104 and the application server 112. The volumetric content presentation system 100 embodies multiple subsystems, which are supported on the client-side by the client application 104 and on the server-side by the application server 112. Example subsystems are discussed below.

An image processing system 402 provides various functions that enable a user to capture and augment (e.g., annotate or otherwise modify or edit) volumetric content or volumetric content items stored in a database 116, a user device 102.

A camera system 404 includes control software (e.g., in a camera application) that interacts with and controls hardware camera hardware (e.g., directly or via operating system controls) of the user device 102 to modify and augment real-time images captured and displayed via the client application 104.

The augmentation system 406 provides various functions that enable a user to augment (e.g., annotate or otherwise modify or edit) media content. For example, the augmentation system 406 provides functions related to the generation, publication, and application of augmentation data such as media overlays (e.g., image filters) to volumetric content. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the user device 102. For example, the media overlay may include text or image that can be overlaid on top of a photograph taken by the user device 102. The augmentation system 406 operatively supplies one or more media overlays to the client application 104 based on a geolocation of the user device 102 or based on other information, such as social network information of the user of the user device 102. The media overlays may be stored in the database 116 and accessed through the database server 114.

Filters are an example of media overlays that are displayed as overlaid on an image or video during presentation to a user. Filters may be of various types, including user-selected filters from a set of filters presented to a user by the client application 104. Other types of filters include geolocation filters (also known as geo-filters), which may be presented to a user based on geographic location. For example, geolocation filters specific to a neighborhood or special location may be presented within a user interface by the client application 104, based on geolocation information determined by a Global Positioning System (GPS) unit of the user device 102.

Another type of filter is a data filter, which may be selectively presented to a user by the client application 104, based on other inputs or information gathered by the user device 102. Examples of data filters include current temperature at a specific location, a current speed at which a sending user is traveling, battery life for user device 102, or the current time.

Volumetric content item are another example of media overlays. A volumetric content item may be a real-time special effect and/or sound that can be added to an image or a video including volumetric images and videos.

Generally, volumetric content items, overlays, image transformations, images, and similar terms refer to modifications that may be applied to image data (e.g., videos or images) including volumetric content. This includes real-time modifications, which either modify what a user sees in his or her volumetric content 622 or modify an image as it is captured using device sensors (e.g., one or multiple cameras) of a user device 102 and then displayed by the user device 102 (e.g., an embedded display of the user device 102) with the modifications. This also includes modifications to stored content, such as volumetric videos in a gallery or collection that may be modified. For example, in a user device 102 with access to multiple volumetric content item, a user can use a single volumetric video with multiple volumetric content items to see how the different volumetric content items will modify the stored content. For example, multiple volumetric content items that apply different pseudorandom movement models can be applied to the same content by selecting different volumetric content items for the content. Similarly, real-time video capture may be used with an illustrated modification to show how video images currently being captured by sensors of a user device 102 would modify the captured data. Such data may simply be displayed on the screen and not stored in memory, or the content captured by the device sensors may be recorded and stored in memory with or without the modifications (or both). In some systems, a preview feature can show how different volumetric content item will look within different windows in a display at the same time. This can, for example, enable multiple windows with different pseudo-random animations to be viewed on a display at the same time.

Data and various systems using volumetric content items or other such augmentation systems to modify content using augmentation data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two-dimensional or three-dimensional) at the tracked position. In still further examples, neural network analysis of video frames may be used to place images, models, or textures in content (e.g., images or frames of video). Volumetric content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, volumetric videos, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be augmented (e.g., edited), elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh can be used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such a method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

The augmentation system 406 can capture an image or video stream on a client device (e.g., the user device 102) and perform complex image manipulations locally on the user device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a machine learning model that has been configured to execute efficiently on the user device 102. In some examples, a computer animation model to transform video and image content can be used by the augmentation system 406 where a neural network operates as part of a client application 104 operating on the user device 102.

The machine learning model can be trained using labeled or unlabeled training data that includes ground-truth information. For example, one or more images depicting a partial and/or whole body of a person can be included in the training data along with the ground-truth segmentation information defining the current positions of limbs and joins of the whole body of the user (e.g., position of arms, torso, legs, head, shoulders, and so forth). The machine learning model can be applied to a subset of the training data, such as one or more images in the training data and can generate an estimate or prediction about the ground-truth segmentation information defining the current positions of limbs and joins of the whole body of the user (e.g., position of arms, torso, legs, head, shoulders, and so forth). The estimate or prediction can be compared with the corresponding ground-truth information to compute a deviation. The deviation can then be used to update one or more parameters of the machine learning model. After updating the one or more parameters, the machine learning model is applied to another subset of the training data and these operations are repeated until a stopping criterion is reached.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data in order to make data-driven predictions or decisions expressed as outputs or assessments. Although examples are presented with respect to a few machine-learning tools, the principles presented herein may be applied to other machine-learning tools.

In some examples, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning algorithms use features for analyzing the data to generate an assessment. Each of the features is an individual measurable property of a phenomenon being observed. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs.

In one example, the features may be of different types and may include one or more of content, concepts, attributes, historical data, and/or user data, merely for example.

The machine-learning algorithms use the training data to find correlations among the identified features that affect the outcome or assessment. In some examples, the training data includes labeled data, which is known data for one or more identified features and one or more outcomes, such as detecting communication patterns, detecting the meaning of the message, generating a summary of a message, detecting action items in messages detecting urgency in the message, detecting a relationship of the user to the sender, calculating score attributes, calculating message scores, etc.

With the training data and the identified features, the machine-learning tool is trained at machine-learning program training. The machine-learning tool appraises the value of the features as they correlate to the training data. The result of the training is the trained machine-learning program.

When the trained machine-learning program is used to perform an assessment, new data is provided as an input to the trained machine-learning program, and the trained machine-learning program generates the assessment as output.

The machine-learning program supports two types of phases, namely a training phase and prediction phase. In training phases, supervised learning, unsupervised or reinforcement learning may be used. For example, the machine-learning program (1) receives features (e.g., as structured or labeled data in supervised learning) and/or (2) identifies features (e.g., unstructured or unlabeled data for unsupervised learning) in training data. In prediction phases, the machine-learning program uses the features for analyzing query data to generate outcomes or predictions, as examples of an assessment.

In the training phase, feature engineering is used to identify features and may include identifying informative, discriminating, and independent features for the effective operation of the machine-learning program in pattern recognition, classification, and regression. In some examples, the training data includes labeled data, which is known data for pre-identified features and one or more outcomes. Each of the features may be a variable or attribute, such as individual measurable property of a process, article, system, or phenomenon represented by a data set (e.g., the training data).

In training phases, the machine-learning program uses the training data to find correlations among the features that affect a predicted outcome or assessment.

With the training data and the identified features, the machine-learning program is trained during the training phase at machine-learning program training. The machine-learning program appraises values of the features as they correlate to the training data. The result of the training is the trained machine-learning program (e.g., a trained or learned model).

Further, the training phases may involve machine learning, in which the training data is structured (e.g., labeled during preprocessing operations), and the trained machine-learning program implements a relatively simple neural network capable of performing, for example, classification and clustering operations. In other examples, the training phase may involve deep learning, in which the training data is unstructured, and the trained machine-learning program implements a deep neural network that is able to perform both feature extraction and classification/clustering operations.

A neural network generated during the training phase, and implemented within the trained machine-learning program, may include a hierarchical (e.g., layered) organization of neurons. For example, neurons (or nodes) may be arranged hierarchically into a number of layers, including an input layer, an output layer, and multiple hidden layers. Each of the layers within the neural network can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network may also be one of a number of different types of neural networks, including a single-layer feed-forward network, an Artificial Neural Network (ANN), a Recurrent Neural Network (RNN), a symmetrically connected neural network, and unsupervised pre-trained network, a Convolutional Neural Network (CNN), or a Recursive Neural Network (RNN), merely for example.

During prediction phases, the trained machine-learning program is used to perform an assessment. Query data is provided as an input to the trained machine-learning program, and the trained machine-learning program, generates the assessment as output, responsive to receipt of the query data.

The image processing system 402 provides a user-based publication platform that enables users to select a geolocation on a map and upload content associated with the selected geolocation. The user may also specify circumstances under which a particular media overlay should be offered to other users. The image processing system 402 generates a media overlay that includes the uploaded content and associates the uploaded content with the selected geolocation.

The augmentation creation system 408 supports augmented reality developer platforms and includes an application for content creators (e.g., artists and developers) to create and publish augmentations (e.g., augmented reality experiences) of the client application 104. The augmentation creation system 408 provides a library of built-in features and tools to content creators including, for example custom shaders, tracking technology, and templates.

In some examples, the augmentation creation system 408 provides a merchant-based publication platform that enables merchants to select a particular augmentation associated with a geolocation via a bidding process. For example, the augmentation creation system 408 associates a media overlay of the highest bidding merchant with a corresponding geolocation for a predefined amount of time.

A user management system 410 is operationally responsible for the management of user data and profiles, and includes a social network system 412 that maintains information regarding relationships between users of the volumetric content presentation system 100.

A collection management system 414 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 414 may also be responsible for publishing an icon that provides notification of a particular collection to the user interface of the client application 104.

The collection management system 414 includes a curation interface that allows a collection manager to manage and curate a particular collection of content. For example, the curation interface enables an event organizer to curate a collection of content relating to a specific event (e.g., delete inappropriate content or redundant messages). Additionally, the collection management system 414 employs machine vision (or image recognition technology) and content rules to curate a content collection automatically. In certain examples, compensation may be paid to a user to include user-generated content into a collection. In such cases, the collection management system 414 operates to automatically make payments to such users to use their content.

The client application 104 presents a graphical user interface (e.g., a landing page or title screen) for an external resource. During, before, or after presenting the landing page or title screen, the client application 104 determines whether the launched external resource has been previously authorized to access user data of the client application 104. In response to determining that the launched external resource has been previously authorized to access user data of the client application 104, the client application 104 presents another graphical user interface of the external resource that includes functions and features of the external resource. In response to determining that the launched external resource has not been previously authorized to access user data of the client application 104, after a threshold period of time (e.g., 3 seconds) of displaying the landing page or title screen of the external resource, the client application 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the client application 104 adds the external resource to a list of authorized external resources and allows the external resource to access user data from the client application 104. The external resource is authorized by the client application 104 to access the user data under an OAuth 2 framework.

The client application 104 controls the type of user data that is shared with external resources based on the type of external resource being authorized. For example, external resources that include full-scale applications are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The immersive experience creation system 416 is responsible for creating immersive AR experiences based on existing volumetric content. In doing so, the immersive experience creation system 416 may utilize one or more known machine learning or artificial intelligence image processing techniques to segment volumetric content to obtain one or more volumetric content items. The immersive experience creation system 416 presents an interactive interface operable to receive selection of the one or more volumetric content items. In some embodiments, the interactive interface may present the volumetric content containing the volumetric content items. The volumetric content items may be outlined, highlighted, or otherwise visually distinguished from other elements to indicate that they are available for selection by the user. The immersive experience creation system 416 receives input indicative of a selection of the one or more volumetric content items from the interactive interface. The selection of the one or more volumetric content items may be utilized in presenting the one or more volumetric content items overlaid on a second real-world environment, thereby creating immersive AR experiences. Further details regarding the creation an AR experiences and presentation of the one or more volumetric content items overlaid on the second real-world environment are discussed below.

Figure 5:
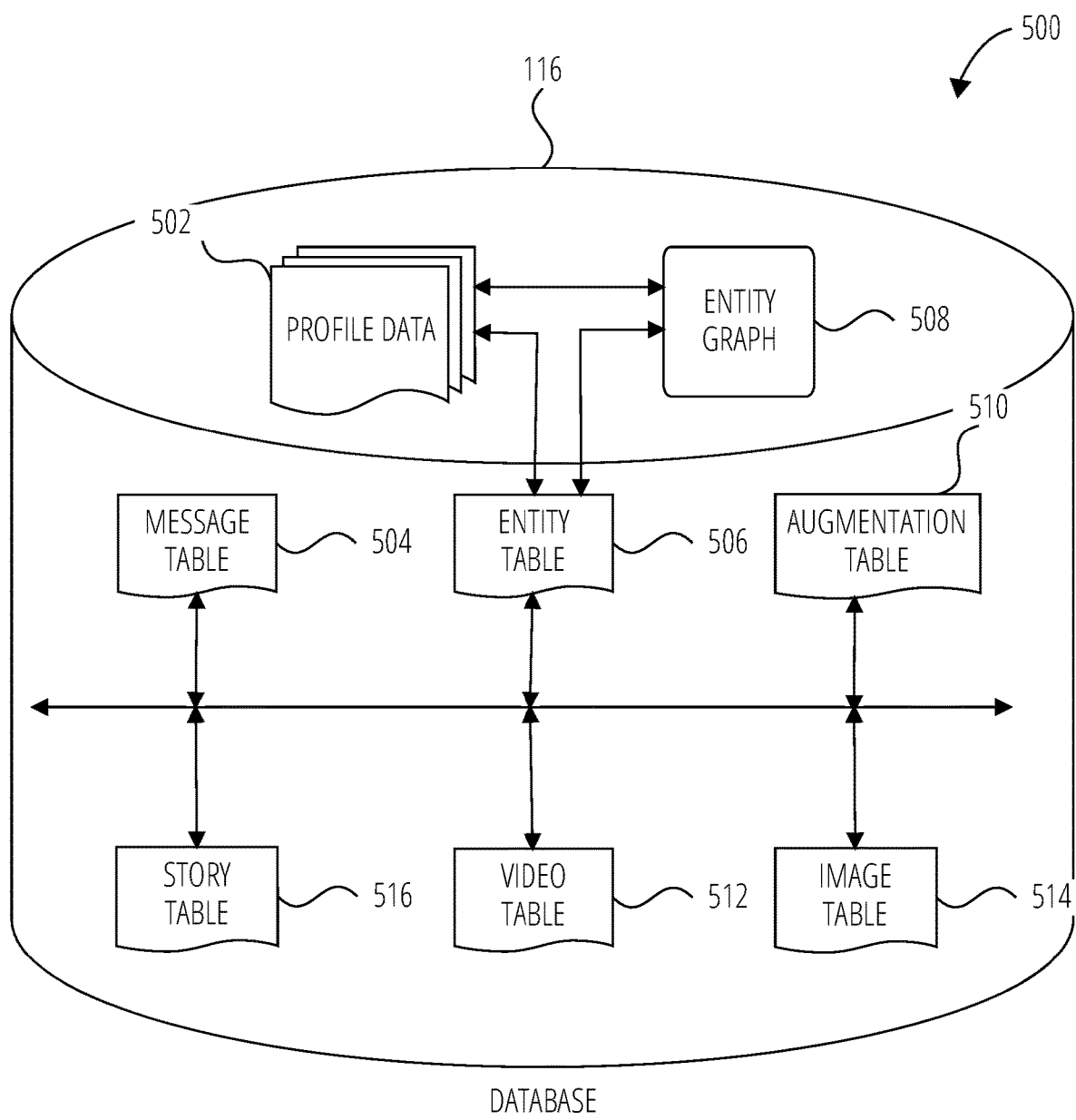
FIG. 5 is a diagrammatic representation of a data structure as maintained in a database, in accordance with some examples.

FIG. 5 is a schematic diagram illustrating data structures 500, which may be stored in the database 116 of the presentation server system 108, according to certain examples. While the content of the database 116 is shown to comprise multiple tables, it will be appreciated that the data could be stored in other types of data structures (e.g., as an object-oriented database).

The database 116 includes message data stored within a message table 504. This message data includes, for any particular message, at least message sender data, message recipient (or receiver) data, and a payload. Further details regarding information that may be included in a message, and included within the message data stored in the message table 504, are described below with reference to FIG. 5.

An entity table 506 stores entity data, and is linked (e.g., referentially) to an entity graph 508 and profile data 502. Entities for which records are maintained within the entity table 506 may include individuals, corporate entities, organizations, objects, places, events, and so forth. Regardless of entity type, any entity regarding which the presentation server system 108 stores data may be a recognized entity. Each entity is provided with a unique identifier, as well as an entity type identifier (not shown).

The entity graph 508 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the volumetric content presentation system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 506. Such privacy settings may be applied to all types of relationships within the context of the volumetric content presentation system 100, or may selectively be applied to only certain types of relationships.

The profile data 502 stores multiple types of profile data about a particular entity. The profile data 502 may be selectively used and presented to other users of the volumetric content presentation system 100 based on privacy settings specified by a particular entity. Where the entity is an individual, the profile data 502 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the volumetric content presentation system 100, and on map interfaces displayed by client application 104 to other users. The collection of avatar representations may include "status avatars," which present a graphical representation of a status or activity that the user may select to communicate at a particular time.

Where the entity is a group, the profile data 502 for the group may similarly include one or more avatar representations associated with the group, in addition to the group name, members, and various settings (e.g., notifications) for the relevant group.

The database 116 also stores augmentation data, such as overlays or filters, in an augmentation table 510. The augmentation data is associated with and applied to videos (for which data is stored in a video table 512) and images (for which data is stored in an image table 514).

Filters, in some examples, are overlays that are displayed as overlaid on an image or video during presentation to a recipient user. Filters may be of various types, including user-selected filters from a set of filters presented to a sending user by the client application 104 when the sending user is composing a message. Other types of filters include geolocation filters (also known as geo-filters), which may be presented to a sending user based on geographic location. For example, geolocation filters specific to a neighborhood or special location may be presented within a user interface by the client application 104, based on geolocation information determined by a Global Positioning System (GPS) unit of the user device 102.

Another type of filter is a data filter, which may be selectively presented to a sending user by the client application 104 based on other inputs or information gathered by the user device 102 during the message creation process. Examples of data filters include current temperature at a specific location, a current speed at which a sending user is traveling, battery life for a user device 102, or the current time.

Other augmentation data that may be stored within the image table 514 includes augmented reality content items (e.g., corresponding to applying Lenses or augmented reality experiences). An augmented reality content item may be a real-time special effect and sound that may be added to an image or a video.

As described above, augmentation data includes volumetric, augmented reality (AR), virtual reality (VR) and mixed reality (MR) content items, overlays, image transformations, images, and modifications that may be applied to image data (e.g., videos or images). This includes real-time modifications, which either modify a visual field of a user that the user can see through the lens of the user device 102 or modify an image as it is captured using device sensors (e.g., one or multiple cameras) of the user device 102 and then displayed on a screen of the user device 102 with the modifications. This also includes modifications to stored content, such as video clips in a collection or group that may be modified. For example, in a user device 102 with access to multiple volumetric content items, a user can use a single video clip with multiple volumetric content items to see how the different volumetric content items will modify the stored clip. Similarly, real-time video capture may use modifications to show how video images currently being captured by sensors of a user device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

A story table 516 stores data regarding collections of messages and associated image, video, or audio data, which are compiled into a collection (e.g., a story or a gallery). The creation of a particular collection may be initiated by a particular user (e.g., each user for which a record is maintained in the entity table 506). A user may create a "personal story" in the form of a collection of content that has been created and sent/broadcast by that user. To this end, the user interface of the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the client application 104, to contribute content to a particular live story. The live story may be identified to the user by the client application 104, based on his or her location. The end result is a "live story" told from a community perspective.

A further type of content collection is known as a "location story," which enables a user whose user device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 512 stores video data that, in some examples, is associated with messages for which records are maintained within the message table 504. Similarly, the image table 514 stores image data associated with messages for which message data is stored in the entity table 506. The entity table 506 may associate various augmentations from the augmentation table 510 with various images and videos stored in the image table 514 and the video table 512.

Figure 6A:
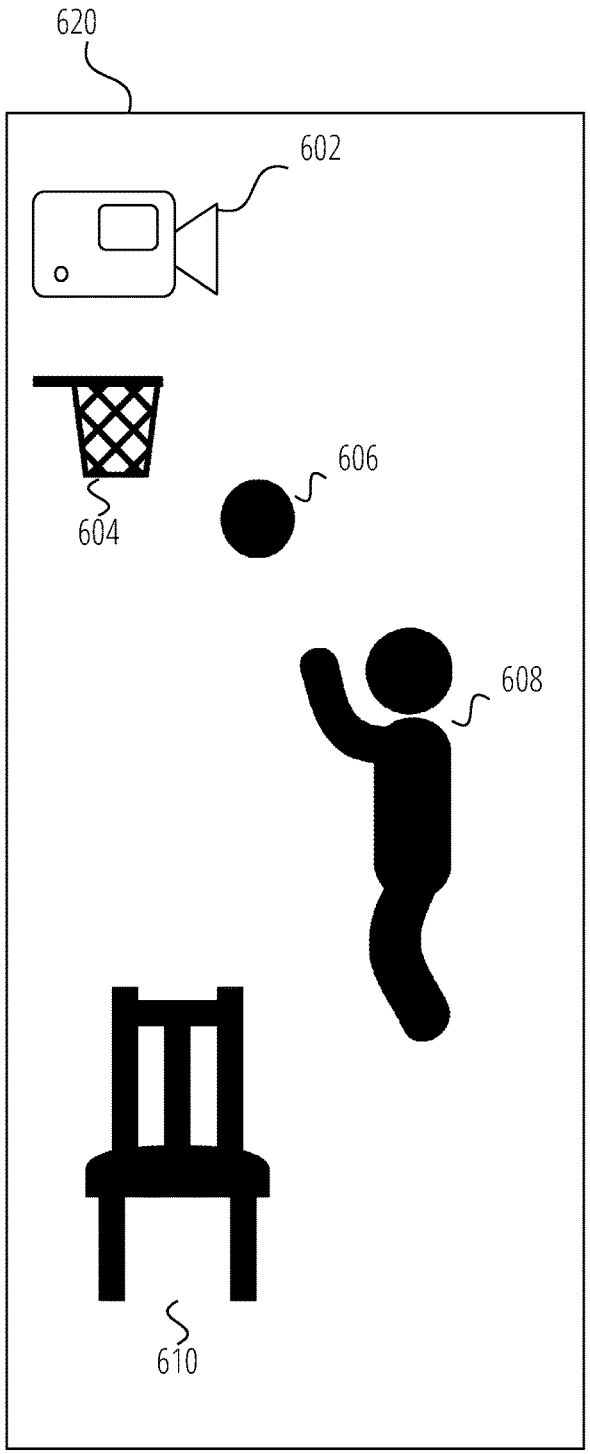
FIG. 6A is a conceptual diagram illustrating use of volumetric capture in creation of volumetric content, in accordance with example embodiments.

FIGS. 6A-6H are conceptual diagrams that illustrate a presentation of example volumetric content, according to some examples. FIG. 6A illustrates use of volumetric capture in creation of volumetric content, in accordance with example embodiments. Volumetric content 622 is created based on videos and/or images generated by a volumetric recording system 602. The videos and/or images capture a first real-world three-dimensional environment 620 from multiple angles. The captured videos and/or images are transformed into to volumetric content 622 using artificial intelligence methodologies. For some examples, the transformation of the captured videos or captured photos to volumetric content 622 may be performed by one or more processors of the volumetric recording system 602 or by at least one of application server 112, database server 114, and one or more processors of the user device 102 using artificial intelligence methodologies. The resulting volumetric content 622 comprises a volumetric representation of one or more elements of the first real-world three-dimensional environment 620.

In some examples, the volumetric recording system 602 may comprise a set of cameras set up in a way that partially or fully surrounds the first real-world three-dimensional environment 620 to capture videos or photos of the first real-world three-dimensional environment 620 and the plurality of elements from various different angles. In some examples, the volumetric recording system 602 may include a drone that hovers over and flies around the first real-world three-dimensional environment 620 to capture videos or photos of the first real-world three-dimensional environment 620. In additional examples, the volumetric recording system 602 may include one or more of a network-connected device (i.e., a mobile phone) or a user device 102 with capability to capture videos or photos.

In the example illustrated in FIG. 6A, the first real-world three-dimensional environment 620 includes a real-world person 608, a real-world hoop 604, a real-world basketball 606, and a real-world chair 610. During the volumetric capture, the real-world person 608 throws the real-world basketball 606 toward the real-world hoop 604 while the real-world chair 610 is stationary. The volumetric recording system 602 may capture videos of the first real-world three-dimensional environment 620. In the captured videos, the real-world person 608 throws the real-world basketball 606 toward the real-world hoop 604, and the real-world chair 610 simply sits in the first real-world three-dimensional environment 620. The volumetric content 622 generated based on the captured video includes volumetric representations of the real-world person 608, the real-world hoop 604, the real-world basketball 606, and the real-world chair 610. That is, the volumetric content 622 includes volumetric content items that correspond to the volumetric representations of each of the real-world person 608, the real-world hoop 604, the real-world basketball 606, and the real-world chair 610.

In other words, volumetric content items included in the volumetric content may correspond to real-world counterparts and may be generated based on the real-world counterparts. These real-world counterparts do not necessarily come from the volumetric capture shown in FIG. 6A, they can also come from a different volumetric capture performed at a different time or location.

In some examples, the volumetric content item may also include volumetric content items that correspond to virtual objects. The virtual object may be a computer-generated object that is imaginary, fictional, or no longer exists in the real-world. For example, a virtual object may be a dinosaur, a dragon that breathes fire, zombies, or wizards. The volumetric content items generated based on virtual objects may be stored in a library of volumetric content items (e.g., stored in the database 116).

Figure 6B:
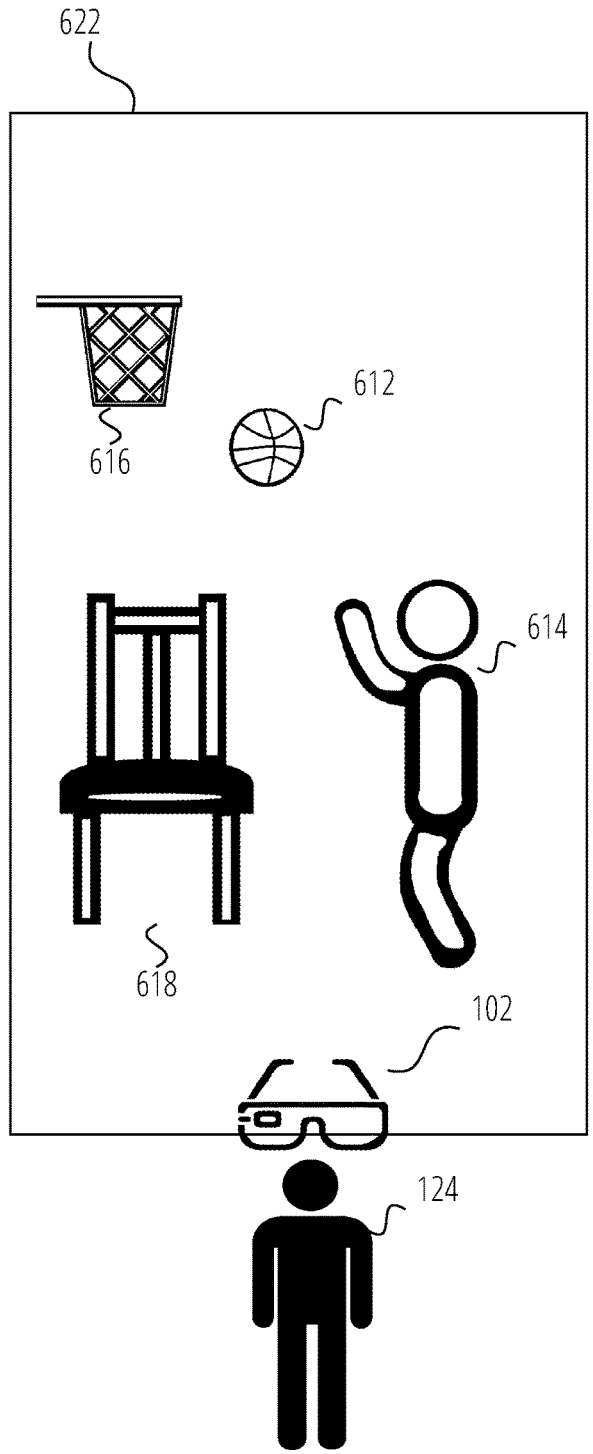
FIG. 6B is a conceptual diagram illustrating example volumetric content items generated based on the volumetric capture, in accordance with example embodiments.

With reference to FIG. 6B, volumetric content 622 generated based on the first real-world three-dimensional environment 620 is shown. The volumetric content 622 includes an AR person 614, an AR hoop 616, an AR basketball 612, and an AR chair 618. The AR person is generated based on the real-world person 608, the AR hoop 616 is generated based on the real-world hoop 604, the AR basketball 612 is generated based on the real-world basketball 606, and the AR chair 618 is generated based on the real-world chair 610. In the example presentation illustrated in FIG. 6B, the AR person 614 may appear to be performing a throwing action when presented by a user device 102 (e.g., user device 102) of user 124 (e.g., the user 124) because the AR person 614 is generated based on one or more videos of the real-world person 608 performing a throwing action.

Figures 6C, 6D:
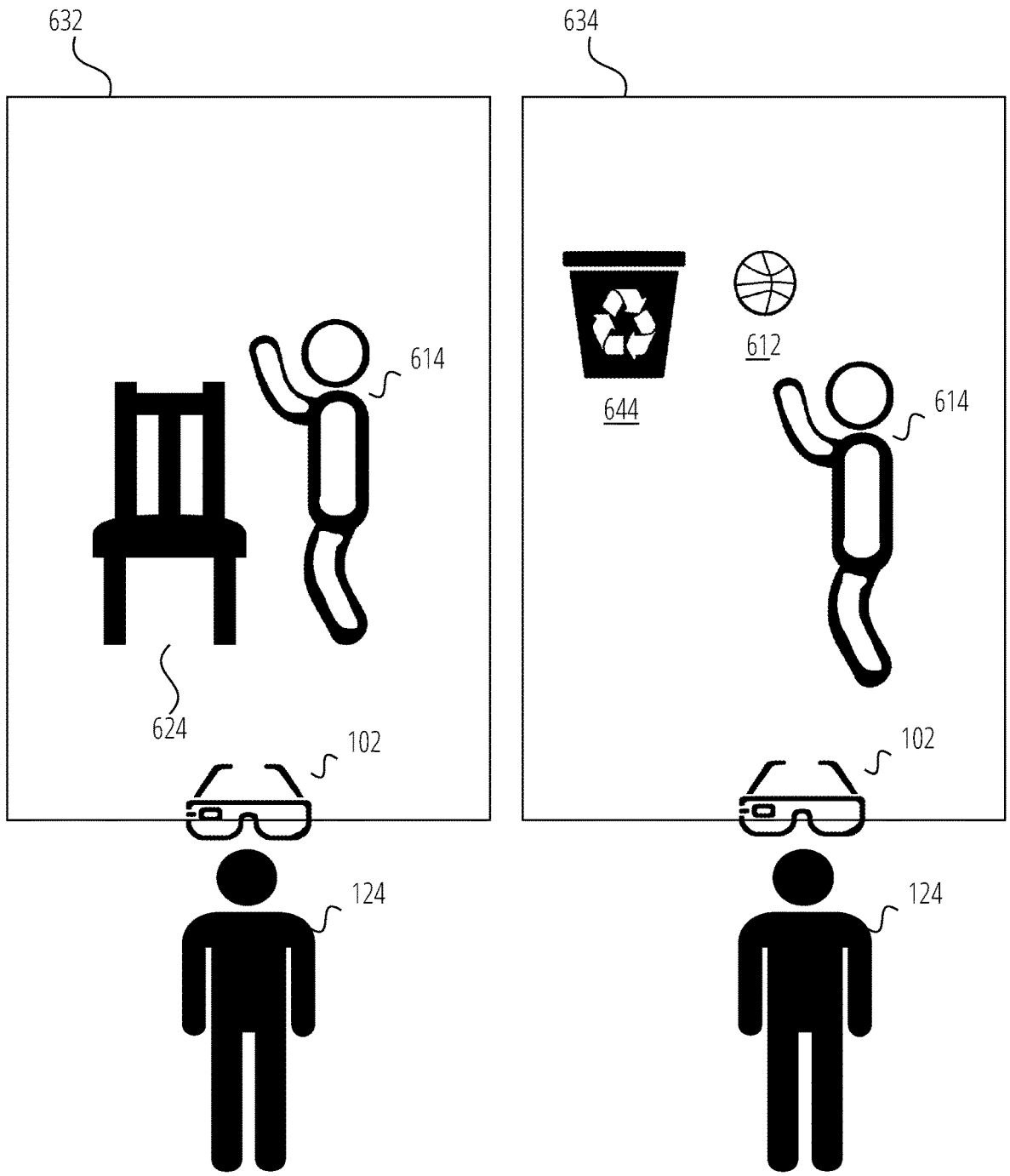
FIG. 6C is a conceptual diagram illustrating an example for presentation of a volumetric content item, in accordance with example embodiments.
FIG. 6D is a conceptual diagram illustrating an example for presentation of a volumetric content item, in accordance with example embodiments.

With reference to FIG. 6C, an example presentation 632 of the volumetric content 622 by the user device 102 is shown. The example presentation 632 includes a real-world chair 610 in a second real-world environment and the AR person 614 overlaid on the second real-world environment that is visible to the user 124 via the user device 102. The user 124 and the real-world person 608 may be different people or may be the same person. The second real-world environment may be the first real-world three-dimensional environment 620 or a different real-world environment. The second real-world environment is determined by the location of the users and what is visible to the user in that location. For example, when the user is the on a rooftop of a building, the second real-world environment may be the rooftop, because the rooftop is visible to the user via the user device 102; alternatively, the second real-world environment may be a city's skyline when the city's skyline is visible to the user 124 who looks far into the distance from the rooftop via the user device 102.

In this example, the second real-world environment is a bedroom. It shall be noted that the real-world chair 624 in FIG. 6C may be the same chair as the real-world chair 610 shown in FIG. 6A. The user 124 may see a chair in the bedroom; meanwhile, the user device 102 presents the AR person 614 overlaid on the chair as if the AR person 614 interacts with the chair. In some examples, the AR person 614 may appear to sit on the chair, pose next to the chair, perform various animated actions around the chair. As a result, the presentation of the volumetric content 622 may include a person sitting on a chair in a bedroom. In some examples, the presentation 632 may include presenting the AR person 614 performing a throwing action next to the chair in the bedroom. The throwing action corresponds to the throwing action performed by the real-world person 608 during volumetric capture.

In some examples, the presentation 632 is performed in response to identifying the real-world object in the second real-world environment. In some examples, the user device 102 may identify a real-world object in the second real-world environment is a real-world chair 610 using artificial-intelligence classification methodologies. In response to identifying the real-world chair 610, the user device 102 may automatically cause presentation of the AR person 614 overlaid on the real-world chair 610 in the volumetric content 622 of the user 124.

With reference to FIG. 6D, an example presentation 634 of the volumetric content 622 by the user device 102 is shown. In this example, the presentation 634 comprises a real-world recycle bin 644 in a second real-world environment and two volumetric content items. The presentation 634 of the volumetric content 622 by the user device 102 includes presentation of the first volumetric content item and the second volumetric content item overlaid on the second real-world environment that is visible to the user 124 via the user device 102, making the two volumetric content items appear to interact with the real-world chair 624 in the second real-world environment.

In this example, the second real-world environment is an office, and a real-world recycle bin 644 is in the office. The first volumetric content item is the AR person 614, and the second volumetric content item is the AR basketball 612. In some examples, in providing presentation 634, the user device 102 may cause the two volumetric content items appear to interact with the real-world recycle bin 644 by presenting the AR person 614 throwing the AR basketball 612 toward the real-world recycle bin 644 and presenting the AR basketball 612 go into the real-world recycle bin 644.

Figures 6E, 6F:
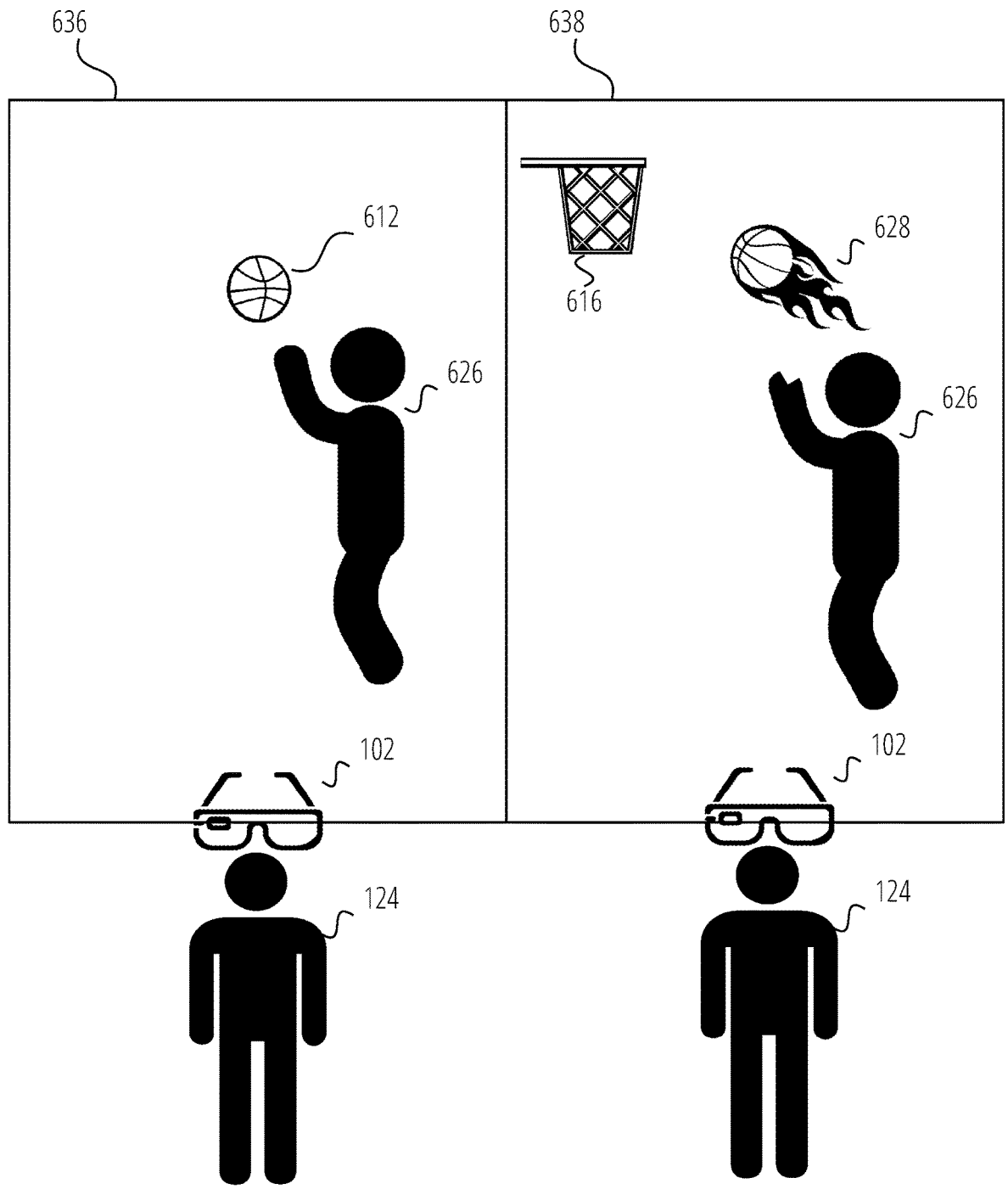
FIG. 6E is a conceptual diagram illustrating an example for presentation of a volumetric content item, in accordance with example embodiments.
FIG. 6F is a conceptual diagram illustrating an example for presentation of a volumetric content item, in accordance with example embodiments.

With reference to FIG. 6E, an example presentation 636 of the volumetric content 622 by the user device 102 is shown. The presentation 636 of the volumetric content 622 comprises a real-world person 626 in the second real-world environment and a volumetric content item. In providing the presentation 636, the user device 102 presents the volumetric content item overlaid on the second real-world environment that is visible to the user 124 via the user device 102, making the volumetric content items appear to interact with the real-world person 626 in the second real-world environment. As an example, the presentation 636 may include a presentation of the AR basketball 612 being thrown by the real-world person 626. The real-world person 626 may be the same as the real-world person 608 or a different person.

With reference to FIG. 6F, an example presentation 638 of the volumetric content 622 by the user device 102 is shown. The presentation 638 comprises a real-world person 626 in a second real-world environment and two a volumetric content items. In providing the presentation 638, the user device 102 may cause presentation of the first volumetric content item and the second volumetric content item overlaid on the second real-world environment that is visible to the user 124 via the user device 102, making the two volumetric content items appear to interact with the real-world person 626 in the second real-world environment.

In this example, the second real-world environment is a basketball court, and a real-world person 626 may be the real-world person 608 or a different person. A first volumetric content item is the AR hoop 616, and a second volumetric content item is an AR virtual on-fire basketball 628. In some examples, the user device 102 may cause the two volumetric content items appear to interact with the real-world person 626 by presenting the real-world person 626 throwing the AR virtual on-fire basketball 628 toward the AR hoop 616. The processes of both the real-world person 626 throwing the AR virtual on-fire basketball 628 and the AR virtual on-fire basketball 628 appearing to be going through the AR hoop 616 to provide the appearance of interactions.

With reference to FIG. 6G, an example presentation 640 of the volumetric content 622 by the user device 102 is shown. In the example illustrated in FIG. 6G, the presentation 640 comprises the AR person 614 and the AR basketball 612 overlaid on a second real-world environment.

In this example, the second real-world environment is a basketball court. The presentation 640 may include presenting the AR person 614 throwing the AR basketball 612 in the air.

With reference to FIG. 6H, an example presentation 642 of the volumetric content 622 by the user device 102 is shown. The presentation 642 comprises an AR person 614, the AR chair 618, and an additional volumetric content item. The user device 102 may cause presentation of the AR person 614, the AR chair 618, and the additional volumetric content item overlaid on a second real-world environment that is visible to the user 124 via the user device 102, making the two volumetric content items appear to interact with the AR person 614 in the second real-world environment.

In this examples, the second real-world environment is a stage. The additional volumetric content item is an AR virtual chair 630. The AR virtual chair 630 may be an imaginary element that does not exist in the physical world. In providing the presentation 642, the display device presents the AR person 614 posing next to both the AR chair 618 and the AR virtual chair 630 thereby presenting interactions between volumetric content items.

Figure 7A:
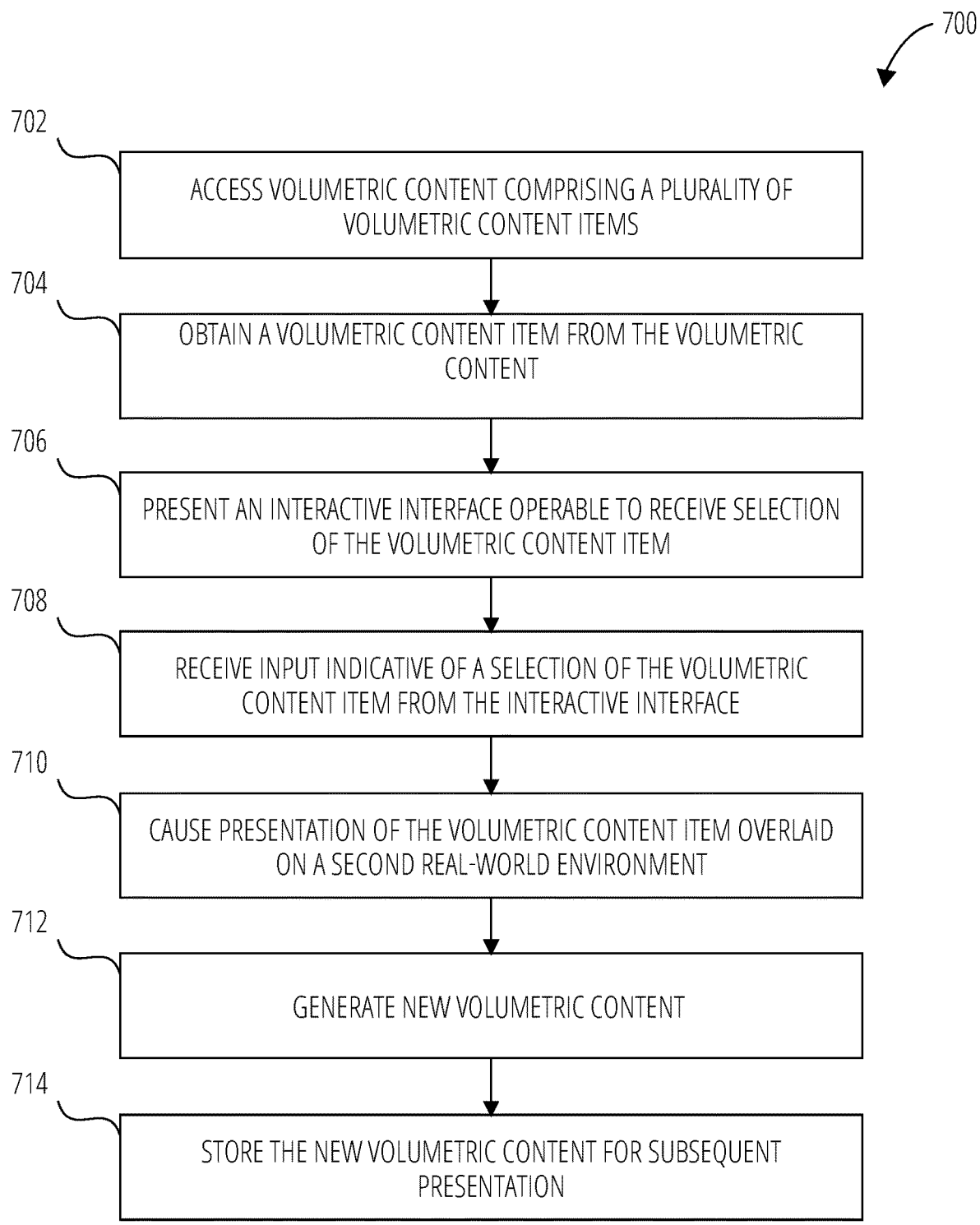
FIG. 7A is a flowchart illustrating example operations of the volumetric content presentation system in performing a method for presenting volumetric content, in accordance with some examples.
Figure 7B:
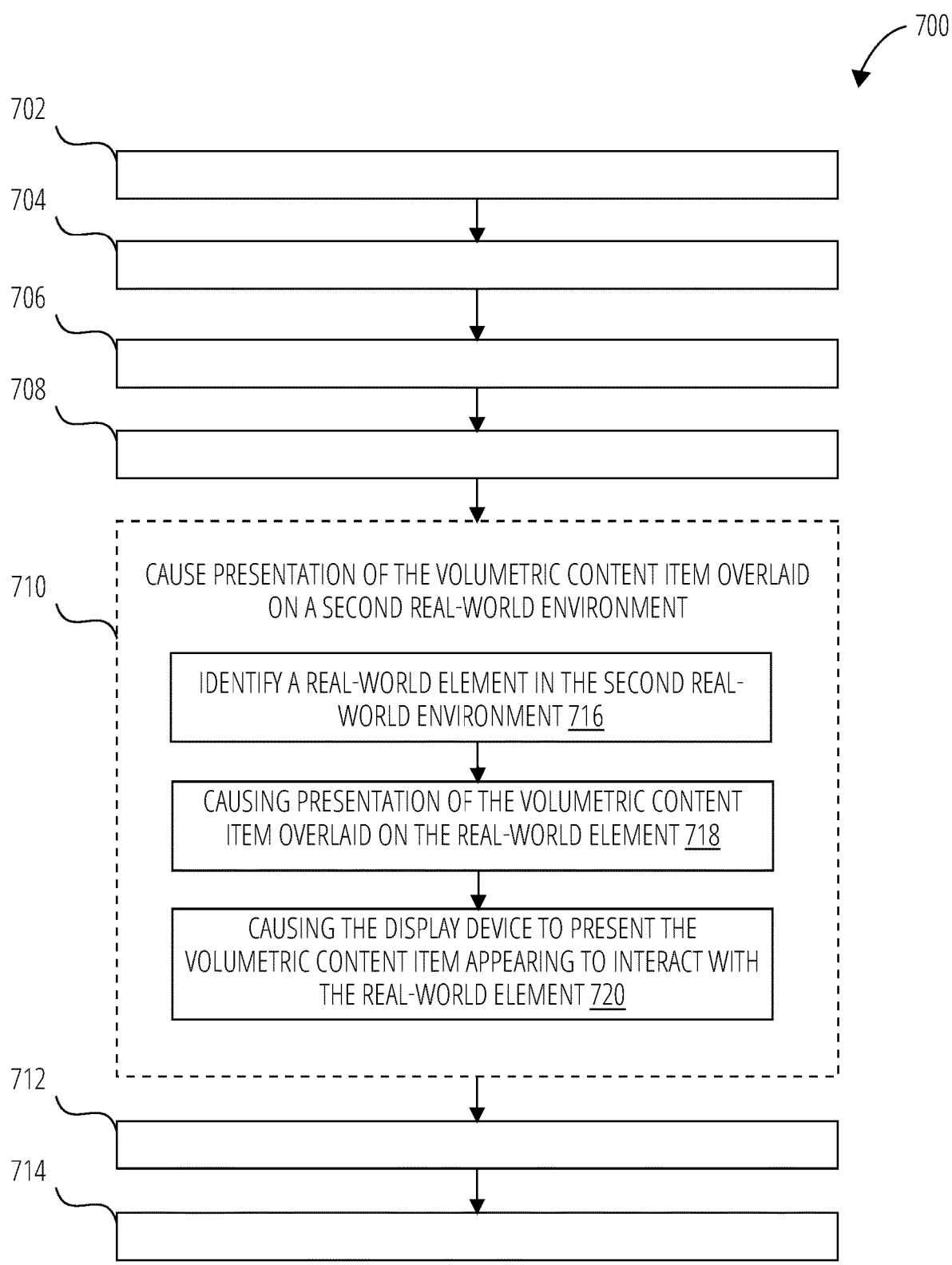
FIG. 7B is a flowchart illustrating example operations of the volumetric content presentation system in performing a method for presenting volumetric content, in accordance with some examples.

FIGS. 7A and 7B are flowcharts illustrating operations of the volumetric content presentation system 100 in performing method 700 for presenting volumetric items, in accordance with some examples. The method 700 may be embodied in computer-readable instructions for execution by one or more processors such that operations of the method 700 may be performed in part or in whole by the functional components of the volumetric content presentation system 100; accordingly, the method 700 is described below by way of example with reference thereto. However, it shall be appreciated that at least some of the operations of the method 700 may be deployed on various other hardware configurations than the volumetric content presentation system 100.

At operation 702, the volumetric content presentation system 100 accesses a volumetric content comprising a plurality of volumetric content items (e.g., AR basketball 612, AR person 614, AR hoop 616, and AR chair 618 shown in FIG. 6B). Each volumetric content item from the plurality of volumetric content items comprises a volumetric representation of an element of a first real-world three-dimensional environment. A volumetric content item may, for example, comprise a volumetric representation of a real-world person or real-world object in the first real-world three-dimensional environment. The volumetric content (e.g., volumetric content 622) may be accessed from the database 116.

At operation 704, the volumetric content presentation system 100 obtains a volumetric content item from the volumetric content. For some embodiments, to obtain the volumetric content item from the volumetric content, the volumetric content presentation system 100 may perform one or more image processing techniques such as segmentation to extract the volumetric content item from the volumetric content. In performing such image processing, the volumetric content presentation system 100 may utilize various known artificial intelligence methodologies. For some embodiments, the volumetric content may be stored such that individual volumetric content items may be independently accessed (e.g., volumetric content items may be stored as individual files) and for these embodiments.

At operation 706, the volumetric content presentation system 100 causes a display device to present an interactive interface operable to receive selection of the volumetric content item from the volumetric content for presentation as part of a new AR experience. For some embodiments, the interactive interface may be presented in conjunction with a presentation of the volumetric content and in these embodiments, the interactive interface allows a user to select the volumetric content item directly from the virtual content. For some embodiments, the interactive interface comprises a library of volumetric content items (e.g., a group of preexisting volumetric content items) for selection.

At operation 708, the volumetric content presentation system 100 receives input indicative of a selection of the volumetric content item from the interactive interface. For some embodiment, the input may correspond to a selection of the volumetric content item directly from the presentation of volumetric content. For some embodiments, the input may correspond to a selection of the volumetric content item from a library of volumetric content items.

At operation 710, the volumetric content presentation system 100 causes presentation of the volumetric content item overlaid on a second real-world environment that is in a visual field of a user of the display device. For some embodiments, the presentation of the volumetric content is projected on one or more optical elements (e.g., the left optical elements 208 and the right optical element 210) of the display device (e.g., user device 102).

In a first example of the presentation of the volumetric content item, the volumetric content item comprises a volumetric representation of a person and the real-world element is an object (e.g., real-world chair 610). In this example, the presentation of the volumetric content item may comprise a presentation of the volumetric representation of the person appearing to interact with the real-world object.

In a second example, the volumetric content item comprises a volumetric representation of a real-world object from the first real-world environment and the real-world element from the second environment is a real-world person. In this example, the presentation of the volumetric content item may include presenting the volumetric representation of the real-world object appearing to interact with the real-world person in the second real-world environment.

In a third example, the volumetric content item is a first volumetric content item and the presentation of the volumetric content item includes presentation of a second volumetric content item that corresponds to a virtual object. That is, the volumetric content presentation system 100 causes the display device to present the volumetric content item from the volumetric content accessed at operation 704 and a second volumetric content item (e.g., corresponding to a virtual object) overlaid on the second real-world environment.

In a fourth example, the volumetric content item is a first volumetric content item comprising a volumetric representation of a first real-world element from the first real-world environment and the presentation of the volumetric content item includes presentation of a second volumetric content item comprising a volumetric representation of a second real-world element from the first real-world environment. In this example, both the first and second volumetric content items are presented as an overlay on the second real-world environment.

In a fifth example, the volumetric content item is a first volumetric content item comprising a volumetric representation of a first real-world element from the first real-world environment and the presentation of the volumetric content item includes presentation of a second volumetric content item comprising a volumetric representation of a second real-world element from the first real-world environment and a third volumetric content item corresponding to a virtual object. In this example, the first, second, and third volumetric content items are presented as an overlay on the second real-world environment.

At operation 712, the volumetric content presentation system 100 generates new volumetric content based on the presentation of the volumetric content item overlaid on the second real-world environment. The new volumetric content comprises the volumetric content item and one or more elements of the second real-world environment. In some instances, the new volumetric content comprises the volumetric content item and a volumetric representation of the one or more elements of the second real-world environment. The volumetric content presentation system 100 stores the new volumetric content for subsequent presentation, at operation 714.

As shown in FIG. 7B, the method 700 may, in some embodiments, further comprise operations 716, 718, and 720. Consistent with these embodiments, the operations 716, 718, and 720 may be performed as part of operation 710, where the volumetric content presentation system 100 causes presentation of the volumetric content item overlaid on a second real-world environment that is in a visual field of a user of the display device.

At operation 716, in causing the presentation, the volumetric content presentation system 100 identifies a real-world element from the second real-world environment, and at operation 718, the volumetric content presentation system 100 causes the display device to present the volumetric content item overlaid on the real-world element. For some embodiments, the volumetric content presentation system 100 causes the display device to present the volumetric content item in response to identifying the real-world element.

At operation 720, the volumetric content presentation system 100 causes the display device to present the volumetric content item in a manner that makes it appear to be interacting with the real-world element. The volumetric content presentation system 100 may utilize one or more known image processing techniques on image data produced by one or more cameras in communication with the display device to identify the real-world element. Various known artificial intelligence techniques can be used in performing the image processing. For some embodiments, the presentation of the volumetric content item overlaid on the real-world element is performed automatically in response to identifying the real-world element.

Figure 8:
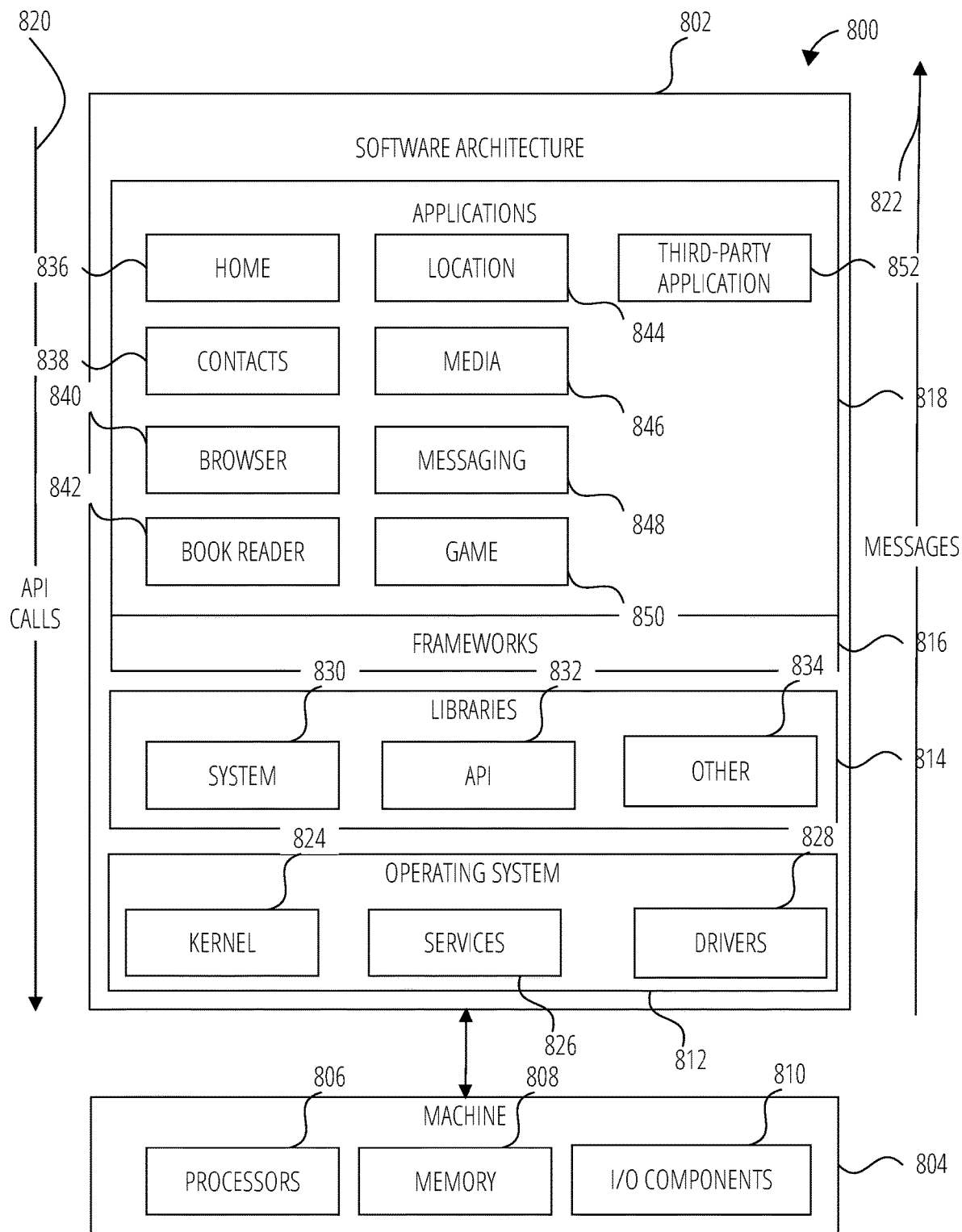
FIG. 8 is a block diagram illustrating a representative software architecture, which may be used in conjunction with various hardware architectures herein described, according to example embodiments.

FIG. 8 is a block diagram illustrating a software architecture 802, which can be installed on any one or more of the devices described herein. The software architecture 802 is supported by hardware such as a machine 804 that includes processors 806, memory 808, and I/O components 810. In this example, the software architecture 802 can be conceptualized as a stack of layers, where each layer provides a particular functionality. The software architecture 802 includes layers such as an operating system 812, libraries 814, frameworks 816, and Applications 818. Operationally, the Applications 818 invoke API calls 820 through the software stack and receive messages 822 in response to the API calls 820.

The operating system 812 manages hardware resources and provides common services. The operating system 812 includes, for example, a kernel 824, services 826, and drivers 828. The kernel 824 acts as an abstraction layer between the hardware and the other software layers. For example, the kernel 824 provides memory management, processor management (e.g., scheduling), component management, networking, and security settings, among other functionalities. The services 826 can provide other common services for the other software layers. The drivers 828 are responsible for controlling or interfacing with the underlying hardware. For instance, the drivers 828 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 814 provide a common low-level infrastructure used by the Applications 818. The libraries 814 can include system libraries 830 (e.g., C standard library) that provide functions such as memory allocation functions, string manipulation functions, mathematic functions, and the like. In addition, the libraries 814 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 814 can also include a wide variety of other libraries 834 to provide many other APIs to the Applications 818.

The frameworks 816 provide a common high-level infrastructure that is used by the Applications 818. For example, the frameworks 816 provide various graphical user interface (GUI) functions, high-level resource management, and high-level location services. The frameworks 816 can provide a broad spectrum of other APIs that can be used by the Applications 818, some of which may be specific to a particular operating system or platform.

In an example, the Applications 818 may include a home Application 836, a contacts Application 838, a browser Application 840, a book reader Application 842, a location Application 844, a media Application 846, a messaging Application 848, a game Application 850, and a broad assortment of other Applications such as a third-party Application 852. The Applications 818 are programs that execute functions defined in the programs. Various programming languages can be employed to create one or more of the Applications 818, structured in a variety of manners, such as object-oriented programming languages (e.g., Objective-C, Java, or C++) or procedural programming languages (e.g., C or assembly language). In a specific example, the third-party Application 852 (e.g., an Application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party Application 852 can invoke the API calls 820 provided by the operating system 812 to facilitate functionalities described herein.

Figure 9:
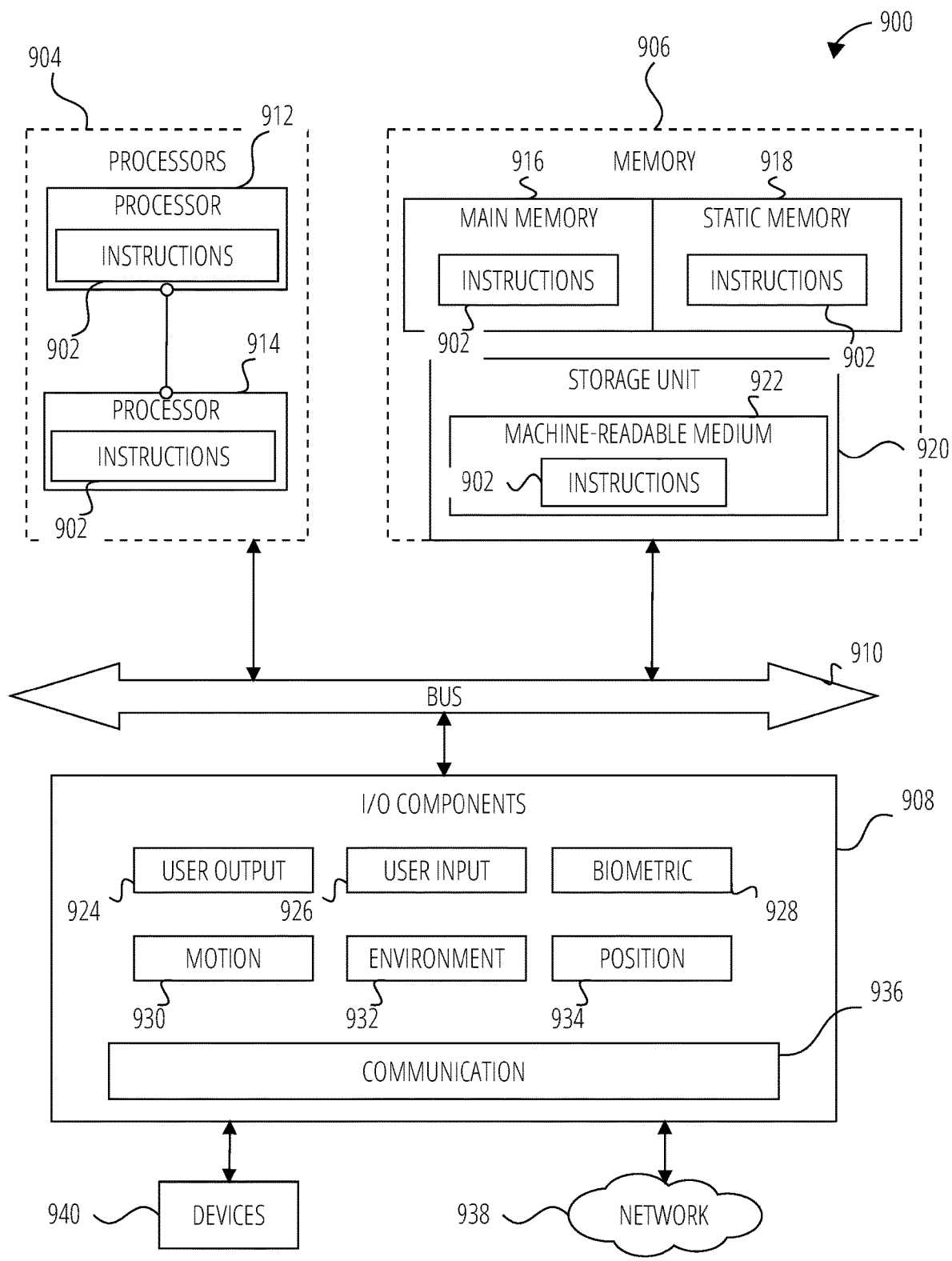
FIG. 9 is a block diagram illustrating components of a machine able to read instructions from a machine-readable medium (e.g., a machine-readable storage medium) and perform any one or more of the methodologies discussed herein, according to example embodiments.

FIG. 9 is a diagrammatic representation of the machine 900 within which instructions 902 (e.g., software, a program, an Application, an applet, an app, or other executable code) for causing the machine 900 to perform any one or more of the methodologies discussed herein may be executed. For example, the instructions 902 may cause the machine 900 to execute any one or more of the methods described herein. The instructions 902 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 902, sequentially or otherwise, that specify actions to be taken by the machine 900. Further, while a single machine 900 is illustrated, the term "machine" shall also be taken to include a collection of machines that individually or jointly execute the instructions 902 to perform any one or more of the methodologies discussed herein. The machine 900, for example, may comprise the user device 102 or any one of multiple server devices forming part of the presentation server system 108. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 908, which may be configured to communicate with each other via a bus 910. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 912 and a processor 914 that execute the instructions 902. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 916, a static memory 918, and a storage unit 920, both accessible to the processors 904 via the bus 910. The main memory 906, the static memory 918, and storage unit 920 store the instructions 902 embodying any one or more of the methodologies or functions described herein. The instructions 902 may also reside, completely or partially, within the main memory 916, within the static memory 918, within machine-readable medium 922 within the storage unit 920, within at least one of the processors 904 (e.g., within the processor's cache memory), or any suitable combination thereof, during execution thereof by the machine 900.

The I/O components 908 may include a wide variety of components to receive input, provide output, produce output, transmit information, exchange information, capture measurements, and so on. The specific I/O components 908 that are included in a particular machine will depend on the type of machine. For example, portable machines such as mobile phones may include a touch input device or other such input mechanisms, while a headless server machine will likely not include such a touch input device. It will be appreciated that the I/O components 908 may include many other components that are not shown in FIG. 9. In various examples, the I/O components 908 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 908 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user device 102 may have a camera system comprising, for example, front cameras on a front surface of the user device 102 and rear cameras on a rear surface of the user device 102. The front cameras may, for example, be used to capture still images and video of a user of the user device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user device 102 may also include a 360° camera for capturing 360° photographs and videos.

Further, the camera system of the user device 102 may include dual rear cameras (e.g., a primary camera as well as a depth-sensing camera), or even triple, quad or penta rear camera configurations on the front and rear sides of the user device 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 908 further include communication components 936 operable to couple the machine 900 to a network 938 or devices 940 via respective coupling or connections. For example, the communication components 936 may include a network interface component or another suitable device to interface with the network 938. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 940 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 916, static memory 918, and memory of the processors 904) and storage unit 920 may store one or more sets of instructions and data structures (e.g., software) embodying or used by any one or more of the methodologies or functions described herein. These instructions (e.g., the instructions 902), when executed by processors 904, cause various operations to implement the disclosed examples.

The instructions 902 may be transmitted or received over the network 938, using a transmission medium, via a network interface device (e.g., a network interface component included in the communication components 936) and using any one of several well-known transfer protocols (e.g., hypertext transfer protocol (HTTP)). Similarly, the instructions 902 may be transmitted or received using a transmission medium via a coupling (e.g., a peer-to-peer coupling) to the devices 940.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, a display device, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an Application or Application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an Application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
accessing, by at least one hardware processor, volumetric content comprising a plurality of volumetric content items, a volumetric content item from the plurality of volumetric content items comprising a volumetric representation of a first real-world element performing an action in a first real-world environment;
obtaining, by the at least one hardware processor, the volumetric content item from the volumetric content;
identifying a second real-world element in a second real-world environment;
causing presentation, by a display device, of the volumetric content item overlaid on the second real-world element in the second real-world environment in a visual field of a user of the display device, the presentation of the volumetric content item comprising displaying the volumetric content item performing the action in the second real-world environment;
detecting hand positions and hand movements of a real-world person in the visual field; and
causing presentation, by the display device, of an interaction between the real-world person and the overlaid volumetric content item based on the hand positions and hand movements.

2. The method of claim 1, further comprising:
presenting an interactive interface operable to receive selection of the volumetric content item from the volumetric content for presentation; and
receiving input indicative of a selection of the volumetric content item from the interactive interface, wherein the causing of the presentation is in response to receiving the input.

3. The method of claim 1, further comprising:
generating new volumetric content based on the presentation of the volumetric content item overlaid on the second real-world environment; and
storing the new volumetric content for subsequent presentation.

4. The method of claim 1, wherein the action performed by the volumetric content item comprises moving from the hand positions to a location of a third real-world object.

5. The method of claim 1, wherein:
the volumetric content item corresponds to a real-world object from the first real-world environment; and
the second real-world element from the second real-world environment corresponds to a real-world person.

6. The method of claim 1, wherein:
the volumetric content item corresponds to a real-world person from the first real-world environment; and
the second real-world element from the second real-world environment corresponds to a real-world object.

7. The method of claim 1, wherein:
the volumetric content item corresponds to a virtual object; and
the second real-world element from the second real-world environment corresponds to a real-world object or a real-world person.

8. The method of claim 1, wherein:
the volumetric content item is a first volumetric content item; and
the method further comprises obtaining a second volumetric content item from the volumetric content; and
the causing of presentation of the volumetric content item overlaid on the second real-world environment comprises causing presentation of the first volumetric content item and the second volumetric content item overlaid on the second real-world environment in the visual field of the user of the display device.

9. A system, comprising:
one or more hardware processors; and
at least one memory storing instructions that cause the one or more hardware processors to perform operations comprising:
accessing, by at least one hardware processor, volumetric content comprising a plurality of volumetric content items, a volumetric content item from the plurality of volumetric content items comprising a volumetric representation of a first real-world element performing an action in a first real-world environment;
obtaining, by the at least one hardware processor, the volumetric content item from the volumetric content;
identifying a second real-world element in a second real-world environment;
causing presentation, by a display device, of the volumetric content item overlaid on the second real-world element in the second real-world environment in a visual field of a user of the display device, the presentation of the volumetric content item comprising displaying the volumetric content item performing the action in the second real-world environment;
detecting hand positions and hand movements of a real-world person in the visual field; and
causing presentation, by the display device, of an interaction between the real-world person and the overlaid volumetric content item based on the hand positions and movements.

10. The system of claim 9, further comprising:
present an interactive interface operable to receive selection of the volumetric content item from the volumetric content for presentation; and
receive input indicative of a selection of the volumetric content item from the interactive interface, wherein the causing of the presentation is in response to receiving the input.

11. The system of claim 9, further comprising:
generating new volumetric content based on the presentation of the volumetric content item overlaid on the second real-world environment; and
storing the new volumetric content for subsequent presentation.

12. The system of claim 9, wherein the action performed by the volumetric content item comprises moving from the hand positions to a location of a third real-world object.

13. The system of claim 9, wherein:
the volumetric content item corresponds to a real-world object from the first real-world environment; and
the second real-world element from the second real-world environment corresponds to a real-world person.

14. The system of claim 9 wherein:
the volumetric content item corresponds to a real-world person from the first real-world environment; and
the second real-world element from the second real-world environment corresponds to a real-world object.

15. The system of claim 9, wherein:
the volumetric content item corresponds to a virtual object; and
the second real-world element from the second real-world environment corresponds to a real-world object or a real-world person.

16. A non-transitory machine-readable medium storing instructions that, when executed by a computer system, cause the computer system to perform operations comprising:
accessing, by at least one hardware processor, volumetric content comprising a plurality of volumetric content items, a volumetric content item from the plurality of volumetric content items comprising a volumetric representation of a first real-world element performing an action in a first real-world environment;
obtaining, by the at least one hardware processor, the volumetric content item from the volumetric content;
identifying a second real-world element in a second real-world environment;
causing presentation, by a display device, of the volumetric content item overlaid on the second real-world element in the second real-world environment in a visual field of a user of the display device, the presentation of the volumetric content item comprising displaying the volumetric content item performing the action in the second real-world environment;
detecting hand positions and hand movements of a real-world person in the visual field; and
causing presentation, by the display device, of an interaction between the real-world person and the overlaid volumetric content item based on the hand positions and movements.

* * * * *